US008953574B2

(12) United States Patent
Schrum, Jr. et al.

(10) Patent No.: US 8,953,574 B2
(45) Date of Patent: Feb. 10, 2015

(54) WIRELESS BRIDGING IN A HYBRID COMMUNICATION NETWORK

(71) Applicant: QUALCOMM Incorporated, San Diego, CA (US)

(72) Inventors: Sidney B. Schrum, Jr., Ocala, FL (US); Lawrence W. Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 13/686,830

(22) Filed: Nov. 27, 2012

(65) Prior Publication Data
US 2013/0136117 A1 May 30, 2013

Related U.S. Application Data

(60) Provisional application No. 61/564,054, filed on Nov. 28, 2011.

(51) Int. Cl.
*H04W 4/00* (2009.01)
*H04W 88/06* (2009.01)
(Continued)

(52) U.S. Cl.
CPC ............. *H04W 88/06* (2013.01); *H04B 3/54* (2013.01); *H04L 45/54* (2013.01); *H04L 12/462* (2013.01); *H04W 40/246* (2013.01);
(Continued)

(58) Field of Classification Search
CPC ............. H04L 29/06068; H04L 29/06095; H04W 84/12; H04W 80/04; H04W 84/18; H04W 88/06; H04W 74/08
USPC ......... 370/328, 329, 330, 338, 389, 390, 392, 370/400, 401, 464, 465, 466
See application file for complete search history.

(56) References Cited

U.S. PATENT DOCUMENTS 7,433,342 B2   10/2008   Carty et al.
8,228,880 B2    7/2012   Kinoshita
(Continued)

FOREIGN PATENT DOCUMENTS

CN     103959663      7/2014
KR   1020140100975    8/2014

OTHER PUBLICATIONS

"PCT Application No. PCT/US2012/066876 International Search Report", Mar. 12, 2013, 9 pages.

*Primary Examiner* — Dady Chery
(74) *Attorney, Agent, or Firm* — DeLizio Gilliam, PLLC

(57) ABSTRACT

A hybrid device can be configured to use WLAN communication links for bridging network traffic between any pair of network devices in a hybrid communication network, irrespective of whether the bridged network devices support WLAN communication. The hybrid device receives a first data frame in a first frame format for transmission to a destination device. The hybrid device accesses its hybrid forwarding tables and identifies a transmit interface from which to transmit the first data frame for transmission to the destination device. If the transmit interface is a WLAN interface, WLAN forwarding tables associated with the WLAN transmit interface are accessed to identify a receiving WLAN device to which the first data frame should be transmitted. The WLAN transmit interface converts the first data frame into a second data frame in a WLAN frame format and transmits the second data frame to the receiving WLAN device.

37 Claims, 7 Drawing Sheets

(51) Int. Cl.

| | | |
|---|---|---|
| *H04B 3/54* | (2006.01) | |
| *H04L 12/741* | (2013.01) | |
| *H04L 12/46* | (2006.01) | |
| *H04W 40/24* | (2009.01) | |
| *H04W 40/30* | (2009.01) | |
| *H04L 12/721* | (2013.01) | |
| *H04L 12/28* | (2006.01) | |
| *H04W 40/00* | (2009.01) | |

(52) U.S. Cl.
 CPC .............. *H04W 40/30* (2013.01); *H04L 45/66* (2013.01); *H04L 12/2836* (2013.01); *H04L 2012/2841* (2013.01); *H04L 2012/2843* (2013.01); *H04W 40/00* (2013.01); *H04B 2203/5408* (2013.01); *H04B 2203/5441* (2013.01); *H04B 2203/5445* (2013.01)
 USPC ............................ 370/338; 370/401; 370/330

(56) References Cited

U.S. PATENT DOCUMENTS

| | | |
|---|---|---|
| 2007/0091871 A1 | 4/2007 | Taha |
| 2007/0189308 A1 | 8/2007 | Tchigevsky et al. |
| 2009/0028121 A1 | 1/2009 | Kinoshita |
| 2010/0220701 A1 | 9/2010 | Levy et al. |
| 2012/0087315 A1 | 4/2012 | Sivaprakasam |

US 8,953,574 B2

WIRELESS BRIDGING IN A HYBRID COMMUNICATION NETWORK

BACKGROUND

Embodiments of the inventive subject matter generally relate to the field of communication networks and, more particularly, to implementing wireless bridging in a hybrid communication network.

Hybrid communication networks typically comprise multiple network devices that implement multiple networking technologies (e.g., wireless local area network (WLAN) technologies, powerline communication technologies, Ethernet, etc.). Typically, the communication mechanisms and protocol specifics (e.g., device and topology discovery, bridging to other networks, etc.) are unique to each networking technology. The multiple networking technologies are typically interconnected using bridging-capable network devices that forward frames between the different network technologies and media to form a single, extended communication network. Hybrid communication networks typically present multiple frame delivery routes between any two hybrid devices.

SUMMARY

Various embodiments for implementing wireless bridging in a hybrid communication network are disclosed. In one embodiment, a first data frame in a first frame format is received at a first network interface of a first hybrid device of a hybrid communication network for transmission to a destination device of the hybrid communication network. It is determined to forward the first data frame via a second network interface (a wireless network interface) of the first hybrid device based, at least in part, on a hybrid forwarding table associated with a hybrid layer of the first hybrid device. It is then determined to forward the first data frame to a second network device of the hybrid communication network based, at least in part, on a wireless forwarding table associated with the second network interface. A second data frame is generated in accordance with a wireless frame format based, at least in part, on the first data frame, the first hybrid device, and the second network device. The second data frame is transmitted from the second network interface of the first hybrid device to the second network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
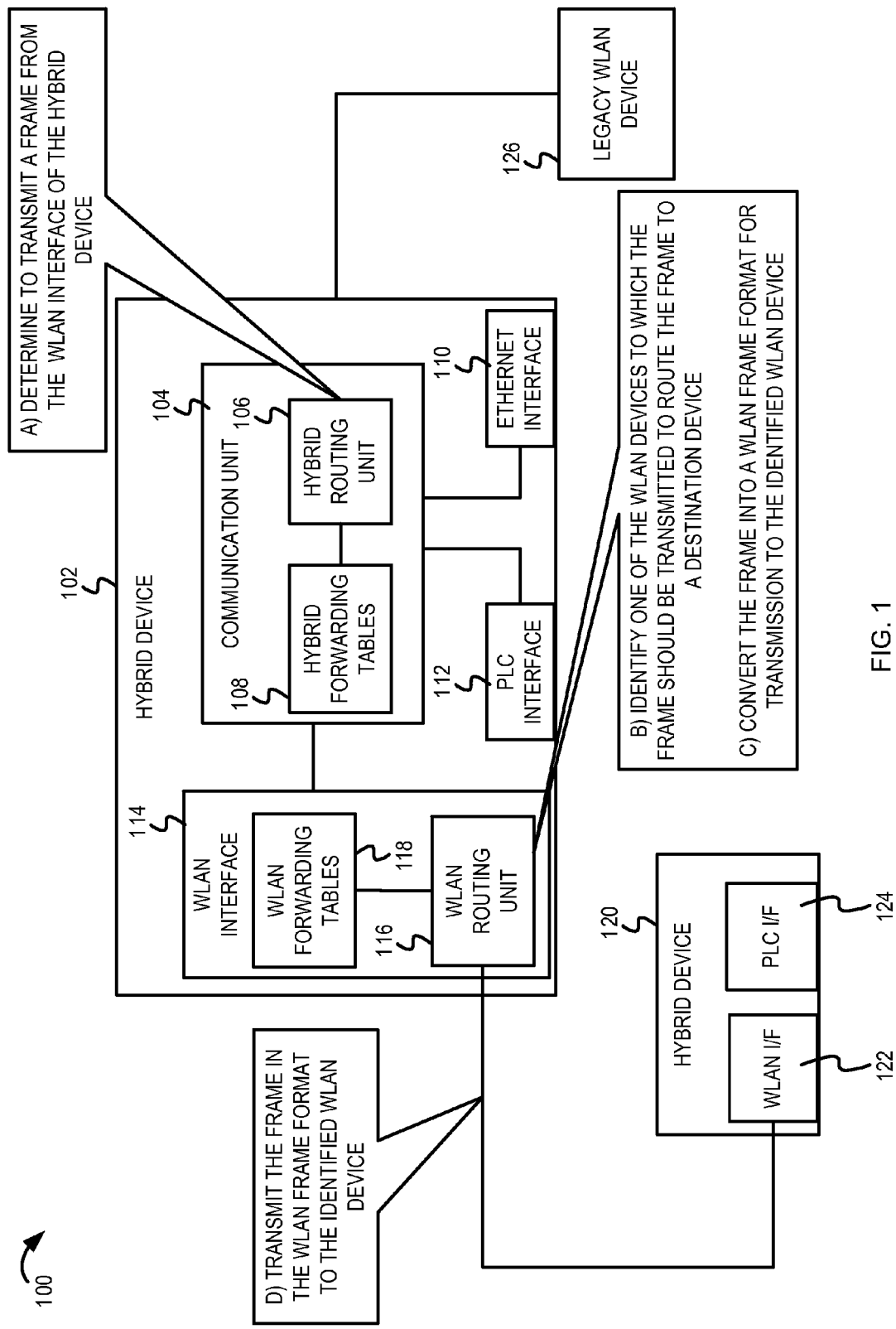
FIG. 1 is an example conceptual diagram illustrating a wireless bridging mechanism in a hybrid communication network.

The description that follows includes exemplary systems, methods, techniques, instruction sequences, and computer program products that embody techniques of the present inventive subject matter. However, it is understood that the described embodiments may be practiced without these specific details. For instance, although in some embodiments, the wireless bridging mechanism can be implemented for hybrid communication networks comprising a wireless local area network (WLAN) segment (e.g., IEEE 802.11 network segment), a powerline network segment (e.g., HomePlug® AV segment) and an Ethernet segment, in other embodiments the wireless bridging mechanism can be implemented for hybrid communication networks that may comprise other suitable types of communication networks and that implement other standards/protocols (e.g., Multimedia over Coax Alliance (MoCA), WiMAX®, etc.). In other instances, well-known instruction instances, protocols, structures, and techniques have not been shown in detail in order not to obfuscate the description.

A hybrid device comprises multiple network interfaces, each of which couples the hybrid device to a (possibly distinct) communication network segment of a hybrid communication network. Multiple interfaces between hybrid devices can result in multiple communication routes between any two hybrid devices in the hybrid communication network. The hybrid communication network can comprise various wired and wireless networking technologies interconnected by forwarding devices (also referred to as "bridges"). However, existing wireless local area network (WLAN) communication standards (e.g., IEEE 802.11 communication standards) enable bridging only via WLAN access points (APs). In the existing WLAN communication standards, the WLAN access points are configured to only forward frames that either originate from a WLAN client station ("WLAN STA") associated with the WLAN access point or that are destined for a WLAN client station associated with the WLAN access point. In other words, the WLAN access points may not forward frames whose source and destination is neither the WLAN access point nor a WLAN client station associated with the WLAN access point. With such limitations in the existing WLAN communication standards, it may be complicated to bridge network devices in the hybrid networking environment across multiple networking technologies. Existing bridging techniques may also not be multivendor interoperable, and may not be specific to the hybrid networking environment with multiple networking technologies and multiple transmission routes between the hybrid devices.

A hybrid device can be configured to use WLAN communication links (e.g., IEEE 802.11 communication links) in a hybrid communication network for transmitting frames across multiple communication network segments of the hybrid communication network. In some embodiments, a hybrid networking layer of the hybrid device can be configured to identify a transmit network interface from which a frame should be transmitted to a destination device. The hybrid networking layer can use hybrid forwarding tables to determine a transmission route and the transmit network interface for the frame. If the transmit network interface is a WLAN interface, the WLAN interface can use WLAN forwarding tables (distinct from the hybrid forwarding tables) to identify the WLAN client station to which to transmit the frame. Specifically, a WLAN access point is typically coupled to (and associated with) a plurality of WLAN client stations. In response to determining to transmit the frame from the WLAN access point (e.g., from the WLAN interface of the hybrid device), the WLAN access point can identify one of the plurality of WLAN client stations to which the frame should be transmitted. The frame can then be converted (if necessary) into a 3-address WLAN frame format or a 4-address WLAN frame format depending on whether the transmitting WLAN interface and/or the receiving WLAN interface are end-points of the transmission route. The frame in the WLAN frame format can then be transmitted from the WLAN interface of the hybrid device to the identified receiving WLAN interface. As will be further described below, configuring the hybrid device to utilize Layer 2 (e.g., medium access control (MAC) layer) forwarding/bridging techniques and 4-address format data frames (e.g., defined by IEEE 802.11 standards), can enable transmission of frames across devices that are not wirelessly connected to each other. Such a wireless bridging mechanism can enable the utilization of wireless communication links (e.g., IEEE 802.11 communication links) for bridging network traffic between any pair of network devices in the hybrid communication network. This can improve system, throughput, frame delivery efficiency, and interface efficiency.

FIG. 1 is an example conceptual diagram illustrating a wireless bridging mechanism in a hybrid communication network 100. The hybrid communication network 100 comprises hybrid devices 102 and 120 and a legacy WLAN device 126. The hybrid device 102 comprises a communication unit 104. The communication unit 104 comprises a hybrid routing unit 106 and a hybrid forwarding table 108. Likewise, although not depicted in FIG. 1, the hybrid device 120 can also comprise a communication unit including a hybrid routing unit and a hybrid forwarding table, as depicted with reference to the hybrid device 102. In some implementations, the hybrid devices 102 and 120 can comprise multiple network interfaces that utilize a plurality of communication protocols (which may also be referred to as networking technologies) to couple the hybrid device to a plurality of communication networks (referred to herein as communication network segments or network segments). In the example of FIG. 1, the hybrid device 102 comprises three network interfaces—an Ethernet interface 110, a powerline communication (PLC) interface 112, and a WLAN interface 114 that enable the hybrid device 102 to connect to an Ethernet segment, a powerline network segment, and a WLAN segment respectively. In the example of FIG. 1, the hybrid device 120 comprises a WLAN interface 122 and a PLC interface 124. It is noted that in other embodiments, the hybrid devices 102 and 120 can comprise any suitable number and type of network interfaces. In FIG. 1, the WLAN interface 114 of the hybrid device 102 comprises a WLAN routing unit 116 and a WLAN forwarding table 118. Although not depicted in FIG. 1, the WLAN interface 122 of the hybrid device 120 may also comprise a WLAN routing unit and a WLAN forwarding table. In some embodiments, the WLAN interface 114 (e.g., a WLAN module of the hybrid device 102) may be configured as an access point of the WLAN segment of the hybrid communication network 100, while the WLAN interface 122 (e.g., a WLAN module of the hybrid device 120) may be configured as a client station of the WLAN segment. In some embodiments, the legacy WLAN device 126 can be configured as a WLAN client station of the WLAN segment. It is noted that legacy network devices may be non-hybrid devices that comprise only one network interface (e.g., the legacy WLAN device 126 only comprises the WLAN interface) that couples the legacy network device to the corresponding single network segment (e.g., the WLAN segment) of the hybrid communication network 100.

In some embodiments, the hybrid devices 102 and 120 can each be electronic devices configured to implement a plurality of communication protocols or networking technologies, such as a laptop computer, a tablet computer, a mobile phone, a smart appliance, a gaming console, an access point, a desktop computer, or other suitable electronic devices. In some embodiments, the communication units of the hybrid devices 102 and 120 can be implemented as part of the hybrid networking layer of the respective hybrid devices 102 and 120. The communication units of the hybrid devices 102 and 120 can be configured to implement at least a subset of communication protocols or networking technologies in a hybrid communication network 100. The communication units of the hybrid devices 102 and 120 can each be implemented on a system-on-a-chip (SoC), an application specific integrated circuit (ASIC), or another suitable integrated circuit to enable network communications on their respective hybrid device. In some embodiments, the communication units may each be implemented in one or more integrated circuits on one or more circuit boards of their respective hybrid device. Likewise, the legacy WLAN device 126 can also be a suitable electronic device with communication capabilities. Communication functionality of the legacy WLAN device 126 (e.g., WLAN communication functionality) can be implemented on an SoC, an ASIC, another suitable integrated circuit, a combination of integrated circuits, or a combination of circuit boards.

Figure 2:
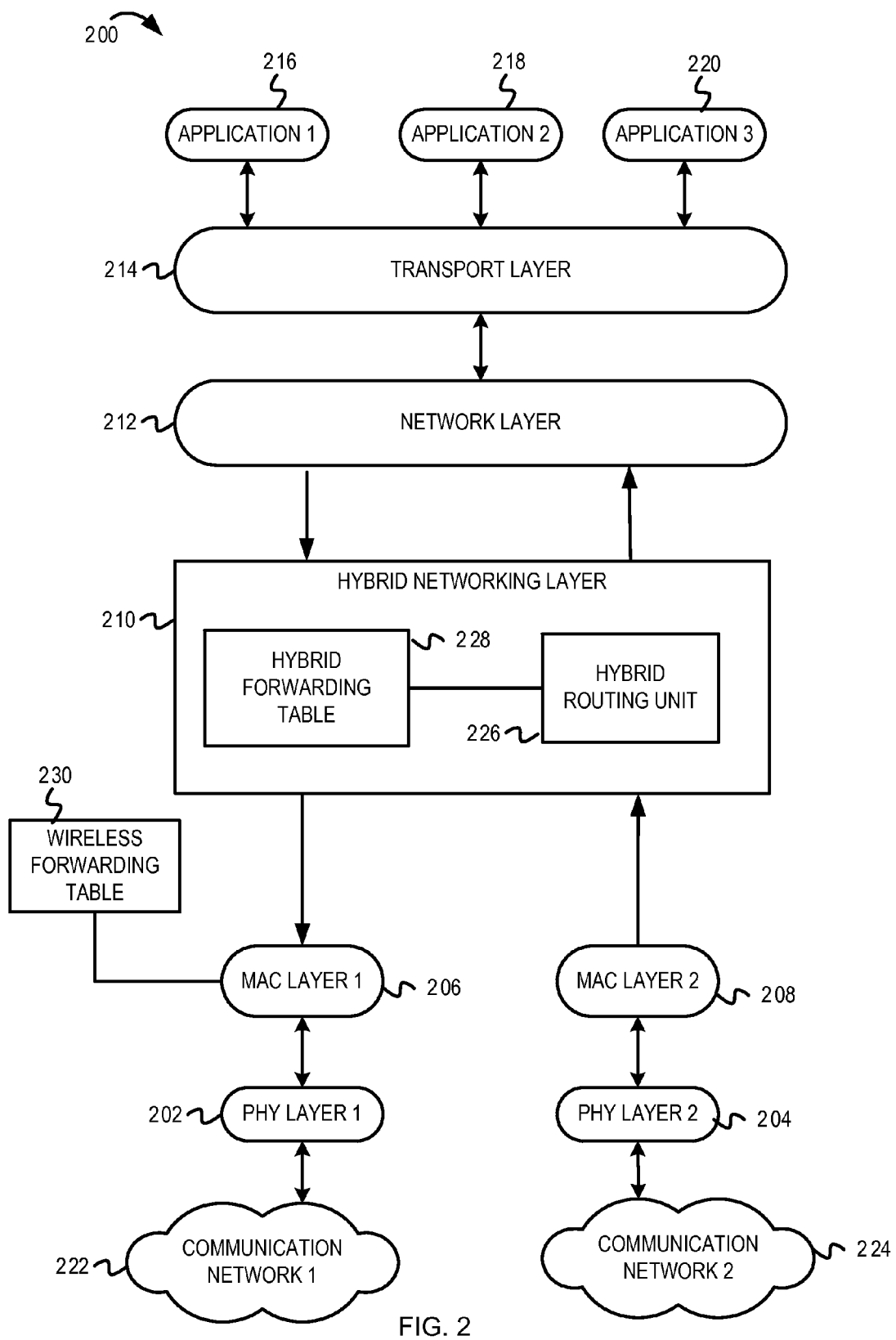
FIG. 2 is a conceptual diagram illustrating an example protocol stack for a hybrid device that implements wireless bridging in a hybrid communication network.

In one implementation, as depicted in FIG. 2, the networking functionality of the hybrid devices 102 and 120 can be partitioned into sub-functions using a "layered" approach, consistent with the International Standards Organization (ISO) Open Systems Interconnection (OSI) reference model. The set of networking protocol layers may be referred to as a "protocol stack." FIG. 2 depicts an example protocol stack 200 for a hybrid device that implements multiple networking interfaces. It is noted that the hybrid devices 102 and 120 can implement the same (or similar) protocol stack as depicted in FIG. 2. In the example protocol stack 200 of FIG. 2, the hybrid device is associated with two communication interfaces. Therefore, the protocol stack 200 comprises two physical (PHY) layers 202 and 204 and corresponding two Medium Access Control (MAC) layers 206 and 208. The MAC layer 206 and the PHY layer 202 couple the hybrid device to one communication network segment 222 (e.g., Ethernet). Similarly, the MAC layer 208 and the PHY layer 204 couple the hybrid device to another communication network segment 224 (e.g., a powerline communication network). It is noted that the communication network segments 222 and 224 can each be a portion/segment of an extended bridged network, such as a hybrid communication network. The protocol stack 200 comprises a network layer 212. The network layer 212 can implement an Internet Protocol version 4 (IPv4) communication protocol, an Internet Protocol version 6 (IPv6) communication protocol, an AppleTalk® communication protocol, or other suitable network layer protocol. The protocol stack 200 also comprises a "hybrid networking layer" 210 between the network layer 212 and the MAC layers 206 and 208. In one example, as depicted in FIG. 2, the hybrid networking layer 210 can comprise a hybrid routing unit 226 and a hybrid forwarding table 228. Also, in one example, if the MAC layer 206 and the PHY layer 202 are part of a wireless interface (e.g., a WLAN interface) that couple the hybrid device to a wireless network segment (e.g., a WLAN segment), the MAC layer 206 and/or the PHY layer 202 can comprise a wireless forwarding table 230. As will be further described below in FIGS. 1, and 3-6, the hybrid routing unit 226 can determine (e.g., based on the hybrid forwarding table 228) how to transmit a frame to a destination device and can identify a network interface from which to transmit the frame. If the frame is scheduled to be transmitted from the wireless network interface (e.g., via the MAC layer 206, the PHY layer 202, and the WLAN segment 222), then the wireless network interface can determine (e.g., based on the wireless forwarding table 230) the receiving wireless network device to which to route the frame for subsequent transmission (if necessary) to the destination device. The protocol stack 200 also comprises a transport layer 214 that operates across the network layer 212. The transport layer 214 can comprise a transmission control protocol (TCP), a user datagram protocol (UDP), or other suitable transport layer protocols depending on the network layer protocol implemented by the hybrid device. The protocol stack 200 also depicts three applications 216, 218, and 220 that utilize the other protocol layers 202-214 for communication with other applications/devices.

In some implementations, the application layer (comprising the applications 216, 218 and 220), the transport layer 214, and the network layer 212 can be collectively referred to as "upper protocol layers." The MAC layers 206 and 208 and the PHY layers 202 and 204 can be collectively referred to as "lower protocol layers." The hybrid networking layer 210 can implement functionality for managing communications in the hybrid device with a single set of upper protocol layers (e.g., a single network layer 212 for each network protocol type implemented and a single transport layer 214 for each transport protocol type implemented) but with multiple networking interfaces (e.g., multiple PHY layers and MAC layers). In one implementation, the hybrid networking layer 210 can interface with the underlying MAC layers 206 and 208 to manage networking resources and to make rapid packet route changes that are transparent to the upper layers of the protocol stack. The hybrid networking layer 210 can also enable the upper protocol layers to operate as if the hybrid device comprises only a single MAC layer and a corresponding single PHY layer. It is noted that the protocol stack 200 depicted in FIG. 2 illustrates one embodiment of the architecture of the hybrid devices 102 and 120. In other implementations, the hybrid devices 102 and 120 can comprise other suitable layers or sub-layers, depending on the networking technology and optional protocols that might be implemented. For example, some networking technologies may implement an Ethernet convergence layer above the MAC layer. As another example, some networking technologies may include a logical link control (LLC) protocol layer. Furthermore, one or more other layers may execute functionality described herein in FIGS. 1 and 3-6. In one example as discussed above, if the MAC layer 206 and the PHY layer 202 are associated with a WLAN segment 222, then in some embodiments, the MAC layer 206 and/or the PHY layer 202 can comprise a WLAN routing unit (not shown) and the WLAN forwarding table 230. In other embodiments, however, the hybrid networking layer 210 can comprise the WLAN forwarding table 230 or can implement at least some functionality of the WLAN routing unit. Referring back to FIG. 1, the hybrid device 102 determine how to route a frame to a destination device based on the hybrid forwarding table 108 associated with the hybrid networking layer and based on a WLAN forwarding table 118 associated with a wireless network interface of the hybrid device 102, as will be described in stages A-D.

At stage A, the hybrid device 102 (e.g., the hybrid routing unit 106) determines to transmit a frame from the WLAN interface 114 of the hybrid device 102. In some embodiments, hybrid device 102 or the communication unit 104 in hybrid device 102 may generate the frame that is scheduled for transmission to a destination device (not shown in FIG. 1). In this embodiment, the hybrid device 102 may be referred to as a "source device." In other embodiments, the hybrid device 102 may receive the frame from another network device (e.g., another hybrid device or a legacy device) for forwarding to the destination device. The hybrid routing unit 106 (e.g., that is implemented as part of the hybrid networking layer of the hybrid device 102) can access the hybrid forwarding table 108 and determine how to route the frame from the hybrid device 102 to the destination device. The hybrid routing unit 106 may identify a transmission route and a transmit network interface for the frame based on content of the hybrid forwarding table 108. In the example of FIG. 1, the hybrid routing unit 106 can determine that the frame should be transmitted from the WLAN interface 114 of the hybrid device 102.

At stage B, the WLAN routing unit 116 identifies one of the WLAN devices to which the frame should be transmitted to route the frame to the destination device. As discussed above, in a WLAN environment, each WLAN device may be connected to more than one other WLAN device. For example, if the WLAN interface 114 is configured as an access point, the access point may be connected to multiple WLAN client stations. As another example, if the WLAN interface 114 is part of a peer-to-peer (P2P) WLAN segment, the WLAN interface 114 may be connected to multiple other WLAN P2P client stations. With reference to the example of FIG. 1, the WLAN interface 114 is connected to the legacy WLAN device 126 and to the WLAN interface 122 of the hybrid device 120. Instead of broadcasting the frame (scheduled for transmission from the WLAN interface 114) on the WLAN segment, the WLAN routing unit 116 can access the WLAN forwarding table 118 to determine to which WLAN device to transmit the frame for subsequent transmission to the destination device. In other words, the WLAN routing unit 116 can determine whether the frame should be forwarded to the legacy WLAN device 126 or the WLAN interface 122 of the hybrid device 120. For example, the WLAN forwarding table 118 may indicate that the frame should be transmitted from the WLAN interface 114 to the WLAN interface 122 of the hybrid device 120. The network device (either a hybrid device or a legacy device) that receives the frame transmitted from the WLAN interface 114 of the hybrid device 102 is referred to as a "receiving network device." It is noted that in some embodiments, the receiving network device may be the ultimate destination of the frame. In this embodiment, the receiving network device 120 may also be referred to as a "destination device." In other embodiments, however, the receiving network device may not be the ultimate destination of the frame. Instead, the receiving network device may be an intermediate device or a forwarding device that receives the frame from the hybrid device 102 and forwards the frame along a transmission route to the ultimate destination device.

At stage C, the WLAN routing unit 116 converts the frame into a WLAN frame format for transmission to the identified WLAN device 120. In some embodiments, the WLAN interface 114 may receive a frame that is in a format that is different from the WLAN frame format. For example, the WLAN interface 114 may receive the frame (e.g., at stage A) in an Ethernet frame format. In response to determining to transmit the frame to the WLAN interface 122 of the hybrid device 120, the WLAN routing unit 116 may convert the frame from the Ethernet frame format into the WLAN frame format. In one embodiment, the WLAN routing unit 116 may generate a new frame in the WLAN frame format and may include the payload of the Ethernet frame in the new WLAN frame. In another embodiment, the WLAN routing unit 116 may strip the Ethernet headers from the received Ethernet frame and may encapsulate the payload of the Ethernet frame with appropriate WLAN headers to generate the WLAN frame. In some embodiments, the WLAN routing unit 116 may also determine whether to use a 3-address WLAN frame format or a 4-address WLAN frame format. As will be further described in FIGS. 3 and 5, if the hybrid device 102 (i.e., the WLAN interface 114) is the source of the frame (i.e., generated the frame) and/or if the hybrid device 120 is the ultimate destination of the frame, the WLAN routing unit 116 can generate the WLAN frame in the 3-address WLAN frame format. Otherwise, the WLAN routing unit 116 can generate the WLAN frame in the 4-address WLAN frame format. It is noted that in other embodiments, the hybrid routing unit 106 may convert the frame from its original frame format to the WLAN frame format (if necessary).

At stage D, the WLAN routing unit 116 transmits the frame in the WLAN frame format to the identified WLAN interface 122 of the hybrid device 120. As will be further described below with reference to FIG. 3, the hybrid device 120 can execute similar operations described above with reference to the hybrid device 102 to determine whether and how to route the received frame to another network device of the hybrid communication network 100.

Figure 3:
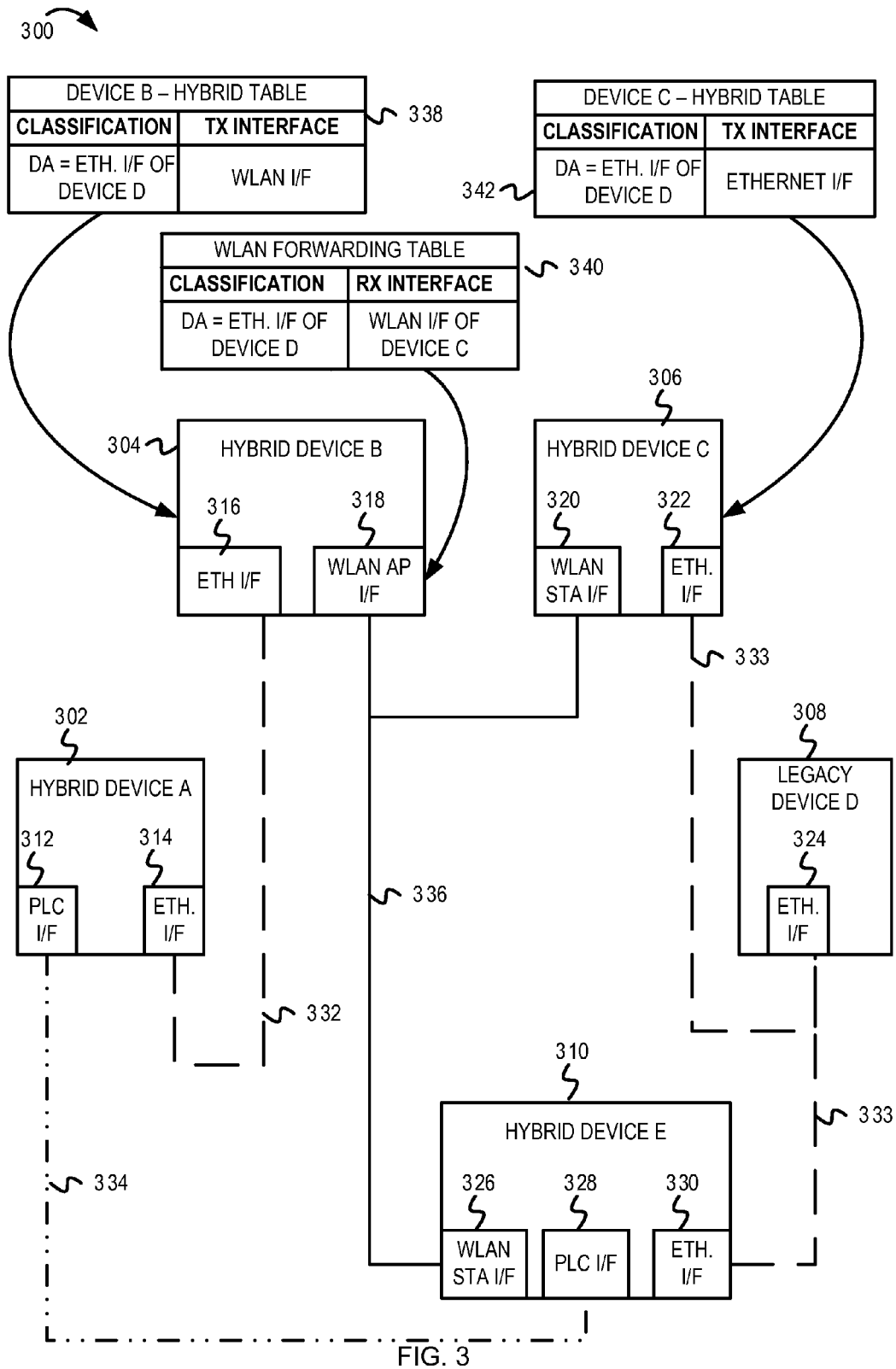
FIG. 3 is an example conceptual diagram illustrating a wireless bridging mechanism across multiple network devices in a hybrid communication network.

FIG. 3 is an example conceptual diagram illustrating a wireless bridging mechanism across multiple network devices in a hybrid communication network 300. The hybrid communication network 300 comprises five network devices 302, 304, 306, 308, and 310. In the example of FIG. 3, the network devices 302, 304, 306, and 310 are hybrid devices that comprise multiple network interfaces, while the network device 308 is a legacy (non-hybrid) device that comprises a single network interface. The hybrid device 302 comprises a PLC interface 312 and an Ethernet interface 314. The hybrid device 304 comprises an Ethernet interface 316 and a WLAN AP interface 318. The hybrid device 306 comprises a WLAN STA interface 320 and an Ethernet interface 322. The hybrid device 310 comprises a WLAN STA interface 326, a PLC interface 328, and an Ethernet interface 330. The legacy device 308 comprises an Ethernet interface 324. The interfaces 314 and 316 are part of a shared Ethernet segment 332 (e.g., possibly connected by a hub) of the hybrid communication network 300. The interfaces 322, 324, and 330 are part of a second shared Ethernet segment 333 of the hybrid communication network 300. The shared Ethernet segments 332 and 333 are represented by dashed lines in FIG. 3. The interfaces 312 and 328 are part of a shared powerline network segment 334 (represented as a dot-and-dash line in FIG. 3) of the hybrid communication network 300. The interfaces 318, 320, and 326 are part of a WLAN segment 336 (represented by solid lines in FIG. 3) of the hybrid communication network 300. In the hybrid communication network 300, the WLAN interface 318 is configured as an access point of the WLAN segment 336, while the WLAN interfaces 320 and 326 are configured as WLAN client stations of the WLAN segment 336. In FIG. 3, the WLAN client interfaces 320 and 326 respectively that are associated with (and connected to) the WLAN AP interface 318. In a traditional WLAN infrastructure network, the communication link from the WLAN AP interface 318 to the WLAN client (or STA) interface 320 and the communication link from the WLAN AP interface 318 to the WLAN client interface 326 cannot be used to bridge traffic for other devices (e.g., cannot be used to bridge traffic from the hybrid device 302 to the network device 308). The wireless bridging procedure described herein makes it possible for devices 302 and 308 to communicate via the devices 304 and 306, as will be further described below.

Each of the hybrid devices 302, 304, 306, and 310 generates and broadcasts topology messages that comprise information about the hybrid device, capability information, which network interfaces (including WLAN interfaces, such as IEEE 802.11 interfaces, if applicable) support frame forwarding, a frame format (e.g., IEEE 802.11 4-address frame format) supported by the WLAN interfaces, information about one or more "neighbor devices" connected to the hybrid device, and/or other link metric information. The topology messages can be link layer topology discovery (LLTD) messages, link layer discovery protocol (LLDP) messages, IEEE 1905.1 topology discovery messages, or other suitable topology messages. In some embodiments, the information transmitted in the topology messages may be encoded using a Type-Length-Value (TLV) format or another suitable format. With reference to the example of FIG. 3, the hybrid device 304 (and the hybrid devices 306 and 310) can indicate (in the topology messages) that it supports forwarding through the WLAN interface 318 and that the WLAN interface 318 supports the 4-address WLAN frame format. As another example, the topology messages may indicate whether the hybrid device 304 supports a 4-address WLAN frame format and/or a 3-address WLAN frame format. In some embodiments, the hybrid device 304 may indicate support for frame forwarding by listing the network interface addresses (e.g., MAC addresses) associated with the network interfaces to/from which the hybrid device 304 can forward frames. For example, support for the 4-address WLAN frame format may be indicated using a capability information bit that is specific to WLAN interfaces (e.g., IEEE 802.11 interfaces) and may be encoded in the TLV format. In some embodiments, the hybrid device 304 may use separate indicators to indicate support for frame forwarding and to indicate support of the 4-address WLAN frame format. Using separate indicators can provide additional granularity for indicating capability information and can enable a conventional WLAN access point to indicate that it supports frame forwarding through the hybrid networking layer but does not support the 4-address WLAN frame format. In other words, the conventional WLAN access point may indicate that it can only forward frames to/from WLAN client stations (or a hybrid device that comprises a WLAN module configured as a client station). The presence of separate indicators can also enable a WLAN access point (e.g., a hybrid device that comprises a WLAN module configured as an access point) to indicate that it does not support the 4-address WLAN frame format but supports frame forwarding using other techniques. The presence of separate indicators can also enable a hybrid device (or another WLAN device) to indicate that it supports the 4-address WLAN frame format but does not support frame forwarding. In other words, the WLAN interface of the hybrid device may accept frames in the 4-address WLAN frame format but may use other techniques (and/or other communication technologies) to forward the frames. However, it is noted that in other embodiments, indicating that a WLAN interface supports frame forwarding can indirectly indicate support for the 4-address WLAN frame format.

The hybrid device 304 can also indicate that the hybrid devices 302, 306, and 310 are its neighbor devices. Specifically, the hybrid device 304 can indicate that the hybrid device 302 is coupled to the Ethernet interface 316 of the hybrid device 304 and that the hybrid devices 306 and 310 are coupled to the WLAN interface 318 of the hybrid device 304. The topology messages may also include available transmission routes (and/or preferred transmission routes) and communication capabilities of the hybrid device 304. In some embodiments, if the hybrid device comprises a WLAN client station (e.g., if the WLAN module of the hybrid device 304 is not configured as an access point), then the hybrid device 304 can specifically indicate direct link capabilities of the WLAN client station (e.g., by setting a predetermined bit in the topology messages). For example, the hybrid device 304 can indicate whether it supports 802.11 direct-link (station-to-station link or STSL) frame transfers based on direct link setup (DLS) communication links via the WLAN interface 318. In other embodiments, direct link capabilities of the WLAN interface 318 may be inferred based on neighbor devices indicated in the topology messages. For example, if a WLAN client station (e.g., a hybrid device comprising a WLAN client station) lists another WLAN client station as a neighbor device, it may be inferred that both the WLAN client stations support the direct link functionality. In some embodiments, the topology messages may also indicate bandwidth capabilities of the hybrid device 304, such as maximum bandwidth for a communication link. In addition, the hybrid device 304 may also periodically transmit messages indicating a current status (e.g., available bandwidth, quality of service indicators, etc.). Likewise, each of the other hybrid devices 302, 306, and 310 can transmit topology messages comprising their respective communication capabilities, neighbor devices, available transmission routes, frame forwarding capabilities, etc., as similarly discussed above with reference to the hybrid device 304.

Each of the hybrid devices 302, 304, 306, and 310 can receive topology messages from other hybrid devices. For example, the hybrid device 304 (e.g., the hybrid routing unit 106 of FIG. 1) can receive topology messages from other hybrid devices 302, 306, and 310 in the hybrid communication network 300. The hybrid device 304 can use the received topology messages and its own topology information to construct a network topology map and a hybrid forwarding table 338 that control the forwarding behavior of hybrid device 304. As depicted in FIG. 3, the hybrid device 306 also generates a hybrid forwarding table 342 based, at least in part, on the received topology messages. Although not depicted in FIG. 3, the hybrid devices 302 and 310 can also generate their respective hybrid forwarding tables. The hybrid forwarding table 338 can indicate a transmit interface (also referred to as an "exit interface") from which a frame should be forwarded to route the frame to a destination device along a selected transmission route. Each of the hybrid devices (e.g., the hybrid device 304) can also transmit their respective hybrid forwarding tables to other hybrid device in the hybrid communication network 300 using management frame request/response protocol exchange messages, forwarding table announcement management frames, network management messages, or other suitable frames.

In some embodiments, each hybrid device (e.g., the hybrid routing unit 106) can generate a complete set of hybrid forwarding tables that identify a transmission route between any two network devices in the hybrid communication network 300. In other embodiments, each hybrid device (e.g., the hybrid routing unit 106) can only generate hybrid forwarding tables for routing frames for which it is the source device or the ultimate destination device. In other embodiments, a combination of the two aforementioned approaches can be employed to construct the hybrid forwarding tables. For example, one of the hybrid devices (e.g., the hybrid device 302) can construct a complete set of forwarding tables for "default" (e.g., best-effort) frame delivery. Further, all of the hybrid devices 302, 304, 306, and 310 can construct their respective hybrid forwarding tables indicating how QoS traffic generated by corresponding hybrid devices should be routed. Each of the hybrid devices can receive the hybrid forwarding tables generated by the other hybrid devices and can populate their hybrid forwarding tables with forwarding rules received in the other hybrid forwarding tables.

Each of the hybrid forwarding tables (e.g., the hybrid forwarding table 338) can comprise one or more forwarding table entries, also referred to as "forwarding rules." Each forwarding rule may include a frame classification specification and a frame forwarding specification. A hybrid device that is scheduled to transmit a frame may attempt to locate a frame forwarding rule, where the frame classification specification matches one or more fields/characteristics of the frame scheduled for transmission. If no matching frame forwarding rule is found, the frame may not be forwarded. If a matching frame forwarding rule is found, the frame may be forwarded using the transmit interface(s) indicated in the corresponding frame forwarding specification. In one embodiment, each frame forwarding rule may be associated with a priority and, if there are multiple matching frame forwarding rules, the frame forwarding rule with the highest priority may be applied. The frame classification specification may include fields/characteristics, which may be compared against corresponding fields/characteristics in the frame scheduled to be transmitted. The frame classification specification may also indicate whether a specific field/characteristic should be matched or ignored when determining if the frame forwarding rule matches a frame scheduled for transmission. For example, the frame classification specification may include the destination MAC address (as depicted in the forwarding tables 338 and 342) and an indication that the destination MAC address (DA) field should be matched. As another example, a multicast address (e.g., a single bit that indicates that the destination address field matches a multicast address), a "no destination address match" bit (e.g., a single bit that identifies the forwarding rule that should be applied if none of the other forwarding rules match), a receive interface, source MAC address, frame priority, EtherType/protocol identifier, VLAN tag, network layer address, network layer port number, and/or other suitable fields/characteristics can be used to select a frame forwarding rule and to determine how to route the frame to the destination device. Typically, the forwarding rule can specify a single transmit interface from which to transmit the frame for a unicast destination address (e.g., based on a spanning tree that is rooted at a destination network interface associated with the destination address (DA) specified in the frame). The forwarding rule can specify multiple transmit interfaces for a broadcast destination address (e.g., based on a common spanning tree that is generated to distribute frames to all network interfaces of all the network devices in the hybrid communication network). The forwarding rule can also specify multiple transmit interfaces for a multicast destination address (e.g., based on a pruned version of the common spanning tree).

In some embodiments, the hybrid device 304 (e.g., the hybrid routing unit 106) can determine whether the hybrid device 304 comprises a wireless interface (e.g., an IEEE 802.11 compatible network interface). In FIG. 3, it may be determined that the hybrid device 304 comprises the WLAN interface 318. In one embodiment, in response to determining that the hybrid device 304 comprises the WLAN interface 318, the hybrid routing unit 106 can populate a WLAN forwarding table 340 that identifies a receiving WLAN device to which the frame should be forwarded. The hybrid routing unit 106 can then provide the WLAN forwarding table 340 to the WLAN interface 318. In another embodiment, a WLAN routing unit of the WLAN interface 318 (e.g., the WLAN routing unit 116) can receive the topology messages, hybrid forwarding tables, and/or other suitable management messages from the hybrid routing unit 106 and can construct the WLAN forwarding table 340. In some embodiments, the WLAN interface 318 can construct the WLAN forwarding table 340 only if the WLAN interface 318 is configured as an access point of the WLAN segment 336. In another embodiment, the WLAN interface 318 can construct the WLAN forwarding table 340 irrespective of whether the WLAN interface 318 is configured as an access point or a client station of the WLAN segment 336. In some embodiments, the WLAN forwarding table 340 can also indicate whether other WLAN devices support a direct peer-to-peer WLAN communication link. In the example of FIG. 3, the WLAN interfaces 320 and 326 may be configured as WLAN client stations ("WLAN STA interface") and the WLAN interface 318 of the hybrid device 304 may be configured as a WLAN access point ("WLAN AP interface"). Accordingly, the WLAN forwarding table (not shown) associated with the WLAN STA interface 326 can indicate whether the other WLAN STA interface 320 to which it is connected supports the direct peer-to-peer WLAN communication link. If so, the WLAN STA interface 326 can directly transmit a WLAN frame to the WLAN STA interface 320. Otherwise, the WLAN STA interface 326 can transmit the WLAN frame to the WLAN AP interface 318 for subsequent transmission to the WLAN STA interface 322. It is noted that in some embodiments, while populating the WLAN forwarding tables, the hybrid device may not distinguish between WLAN communication links between access points, WLAN communication links between and access point and a client station, and direct WLAN communication links between client stations. In other embodiments, however, the WLAN interfaces (e.g., the IEEE 802.11 interfaces) that are directly reachable from a particular WLAN interface can be maintained in a list that is separate from the WLAN forwarding table 340.

In some embodiments, each entry (or forwarding rule) in the WLAN forwarding table 340 may include a pair of network interface addresses (e.g., MAC addresses). The first MAC address may be compared against the destination MAC address in frames scheduled to be transmitted. If a matching forwarding rule is identified, the second MAC address in the matching forwarding rule can indicate the receiving WLAN device (e.g., a legacy WLAN device or a WLAN interface of a hybrid device) to which the frame should be transmitted. In the case of a last hop (or communication link) in a transmission route, the two MAC addresses in the forwarding rule may be the same. The WLAN forwarding table 340 may also include forwarding rules for multicast frames. The WLAN forwarding table 340 can also include additional match fields, such as source address fields, frame priority fields, and other suitable fields/characteristics, to differentiate between different routes for the same destination address. In some embodiments, the information identifying the receiving WLAN interface can be incorporated directly into the hybrid forwarding table by including an additional MAC address field that indicates the receiving WLAN interface to which the frame should be transmitted. In this embodiment, the hybrid networking layer (e.g., the hybrid routing unit 106) can identify the MAC address of the "next hop" (i.e., the receiving WLAN interface) and can notify the WLAN interface 318 of the MAC address of the next hop.

The subsequent discussion will describe how the wireless bridging mechanism is used to forward a frame from the hybrid device 302 to the legacy device 308 via the hybrid devices 304 and 306. With reference to the example of FIG. 3, the hybrid device 302 generates a frame for transmission to the destination device 308. The hybrid device 302 selects a transmission route (based on its hybrid forwarding table) for transmitting the frame to the destination device 308. The hybrid forwarding table (not shown in FIG. 3) of the hybrid device 302 may indicate that if the frame is destined for the Ethernet interface 324 of the destination device 308, then the frame should be transmitted from the Ethernet interface 314 of the hybrid device 302. Therefore, the hybrid device 302 (e.g., the hybrid routing unit 106) can generate the frame in an Ethernet frame format (for transmission from the Ethernet interface 314). In some embodiments, the Ethernet frame can indicate the original source device 302 and the ultimate destination device 308. Additionally, in some embodiments, the Ethernet frame can also indicate the endpoints (i.e., a current transmitting device and a current receiving device) of a current communication link (also referred to as a "hop" or a path between two adjacent devices) in the transmission route. In the example of FIG. 3, the Ethernet frame can indicate that the hybrid device 302 is the current transmitting device and that the hybrid device 304 is the current receiving device. It is noted that in some embodiments, if the current transmitting device is the same as the source device or if the current receiving device is the same as the destination device, then the Ethernet frame may only include three address fields. The hybrid device (e.g., the hybrid routing unit 106) can provide the Ethernet frame to the source Ethernet interface 314 for transmission to the Ethernet interface 316 (and for subsequent transmission to the destination device 308).

The hybrid device 304 receives the Ethernet frame at the Ethernet interface 316 and provides the frame to the hybrid networking layer (e.g., the hybrid routing unit 106) to determine how to process the received frame. The hybrid device 304 can determine that the received Ethernet frame is to be forwarded to the destination device 308. The hybrid device 304 can access the hybrid forwarding table 338 to determine the transmit interface from which to forward the received Ethernet frame to the destination device 308. With reference to the specific example of FIG. 3, the hybrid forwarding table 338 of the hybrid device 304 indicates that if the destination interface is the Ethernet interface 324, then the frame should be forwarded from the WLAN interface 318 of the hybrid device 304. Because the transmit interface of the hybrid device 304 is a WLAN interface (e.g., an IEEE 802.11 interface), the WLAN forwarding table 340 of the WLAN interface 318 can be accessed to identify the receiving WLAN client station to forward the frame. Specifically, the WLAN forwarding table 340 can indicate whether the frame should be forwarded to the WLAN interface 320 of the hybrid device 306 or the WLAN interface 326 of the hybrid device 310 for subsequent forwarding to the destination device 308. With reference to the specific example of FIG. 3, the WLAN forwarding table 340 can indicate that if the destination interface is the Ethernet interface 324, then the frame should be forwarded to the WLAN interface 320 of the hybrid device 306.

The WLAN interface 318 (e.g., the WLAN routing unit 116) can convert the Ethernet frame (received from the Ethernet interface 314 of the hybrid device 302) into a WLAN frame. Depending on whether the WLAN interface 318 is the source network interface and/or whether the WLAN interface 320 is the ultimate destination network interface, the WLAN interface 318 can convert the Ethernet frame into a 3-address WLAN frame or a 4-address WLAN frame. In the example of FIG. 3, the WLAN interface 318 is not the original source interface and the WLAN interface 320 is not the ultimate destination interface. Accordingly, the WLAN interface 318 can convert the Ethernet frame into a 4-address WLAN frame.

The 4-address WLAN frame can indicate the original source device (e.g., an address of the Ethernet interface 314 of the hybrid device 302), the ultimate destination device (e.g., an address of the Ethernet interface 324 of the network device 308), the current transmitting device of the current hop (e.g., an address of the WLAN interface 318 of the hybrid device 304), and the current receiving device of the current hop (e.g., an address of the WLAN interface 320 of the hybrid device 306). Otherwise, if the transmitting WLAN interface 318 is the original source interface or if the receiving WLAN interface 320 is the ultimate destination interface, the WLAN interface 318 can construct a 3-address WLAN frame. The WLAN frame is transmitted from the WLAN interface 318 to the WLAN interface 320 of the hybrid device 306.

The hybrid device 306 receives the 4-address WLAN frame at the WLAN interface 320, reconstructs the original Ethernet frame from the received WLAN frame, and passes the frame to the hybrid layer (e.g., the hybrid routing unit 106 of FIG. 1) of the hybrid device 306. The hybrid device 306 (e.g., the hybrid routing unit 106) can access its hybrid forwarding table 342 and can determine how to route the frame to the destination network interface 324 of the destination device 308. With reference to the specific example of FIG. 3, hybrid forwarding table 342 of the hybrid device 306 indicates that if the destination interface is the Ethernet interface 324, then the frame should be forwarded from the Ethernet interface 322 of the hybrid device 306 to the Ethernet interface 324 of the network device 308.

It is noted that the wireless bridging techniques described herein can also be extended to transmitting broadcast and multicast frames in the hybrid communication network. Referring to the example of FIG. 3, the WLAN STA interface 320 can transmit broadcast frames (either generated or received by the hybrid device 306) to the WLAN AP interface 318 using the 4-address WLAN frame format with a unicast receive address (e.g., an address of the WLAN AP interface 320) and a predetermined broadcast destination address. The WLAN AP interface 318 can broadcast the frame (e.g., using the 3-address WLAN frame format) to all WLAN client stations 320 and 326 associated with the WLAN AP interface 318. Consequently, the WLAN STA interface 320 may receive a copy of the broadcast frame (originally transmitted by the WLAN STA interface 320 to the WLAN AP interface 318). The WLAN STA interface 320 can execute frame-filtering operations to discard broadcast frames that were originally transmitted from the WLAN STA interface 320. In some embodiments, the frame classification specification of the frame forwarding rules may not specify the receive interface for forwarding broadcast and multicast frames. In other words, the frame classification specification may not indicate to which receive interfaces the broadcast (or multicast) frames should be transmitted. In this embodiment, the receive interface may be automatically eliminated from the set of interfaces that are used to transmit the frame, even if the interface is included in the frame forwarding specification. This can enable construction of a common spanning tree (for distributing broadcast frames) that allows broadcast frames that originated at any point in the spanning tree to be distributed throughout the network without causing an "explosion" of replicated broadcast frames. In some embodiments, the hybrid forwarding table (and/or the WLAN forwarding table) can comprise frame forwarding rules for forwarding broadcast and multicast frames. For example, the hybrid forwarding table 342 for the hybrid device 306 can include the source address field in the frame classification specification of the frame forwarding rules associated with broadcast and/or multicast frames. The frame forwarding rules associated with broadcast and/or multicast frames can ensure that the hybrid device 306 only forwards broadcast frames (received at the WLAN interface 320) that were not previously transmitted from WLAN interface 320. Therefore, if the WLAN interface 320 of the hybrid device 306 receives a copy of a broadcast frame (that was previously transmitted by the WLAN interface 320) from the WLAN interface 318, the hybrid device 306 (e.g., the hybrid routing unit 106) can discard the received frames based on failure to match the source address field.

In some embodiments, the WLAN forwarding table (of the WLAN interface 320) can comprise an indication (e.g., an address) of one or more network devices that are reachable through the WLAN interface 320. In response to receiving a broadcast frame from the WLAN interface 318, the WLAN routing unit 116 can filter the broadcast frame based, at least in part, on an original source address field in the received broadcast frame. For example, the WLAN routing unit 116 can compare the original source address field in the received broadcast frame with the address associated with each of the network devices that are reachable through the WLAN interface 320. If the original source address field comprises an address associated with one of the network devices that are reachable through the WLAN interface 320, the hybrid device 306 (e.g., the hybrid routing unit 106) can discard the received broadcast frame.

In some embodiments, prior to the WLAN interface 320 transmitting a frame with a predetermined broadcast destination address to the WLAN interface 318 (for subsequent broadcasting in the WLAN segment 336), the WLAN interface 320 (e.g., the WLAN routing unit 116) can insert an indicator field in the frame. The indicator field (e.g., comprising a predetermined set of bits, such as a tag or address) can indicate that the WLAN interface 320 will transmit the frame to the WLAN interface 318. In response to receiving a broadcast frame from the WLAN interface 318, the WLAN interface 320 (e.g., the WLAN routing unit 116) can determine whether the received broadcast frame comprises the indicator field associated with the WLAN interface 320. If the received broadcast frame comprises the indicator field associated with the WLAN interface 320, it may be inferred that the WLAN interface 320 originally transmitted the frame to the WLAN interface 318. Consequently, the hybrid device 306 can discard the received broadcast frame.

In some embodiments, to enable forwarding of broadcast frames, the WLAN forwarding table can comprise a forwarding rule that lists a broadcast address as both the first address (e.g., against which the destination address in a received frame is compared) and the second address (e.g., that indicates to which WLAN device the received frame should be transmitted). In some embodiments, the WLAN forwarding table can also include a forwarding rule for each multicast address to be forwarded, so that the multicast address is indicated as both the first address and the second fields of the forwarding rule. In some embodiments, to forward broadcast and multicast frames, the WLAN forwarding table for a WLAN client station can indicate the MAC address of the WLAN access point associated with the WLAN client station as the second address. In other words, if the WLAN client station determines that a frame is scheduled to be broadcast (or multicast), the WLAN client station can forward the frame to its WLAN access point, thus causing the WLAN access point to broadcast (or multicast) the frame on behalf of the WLAN client station.

Figure 4:
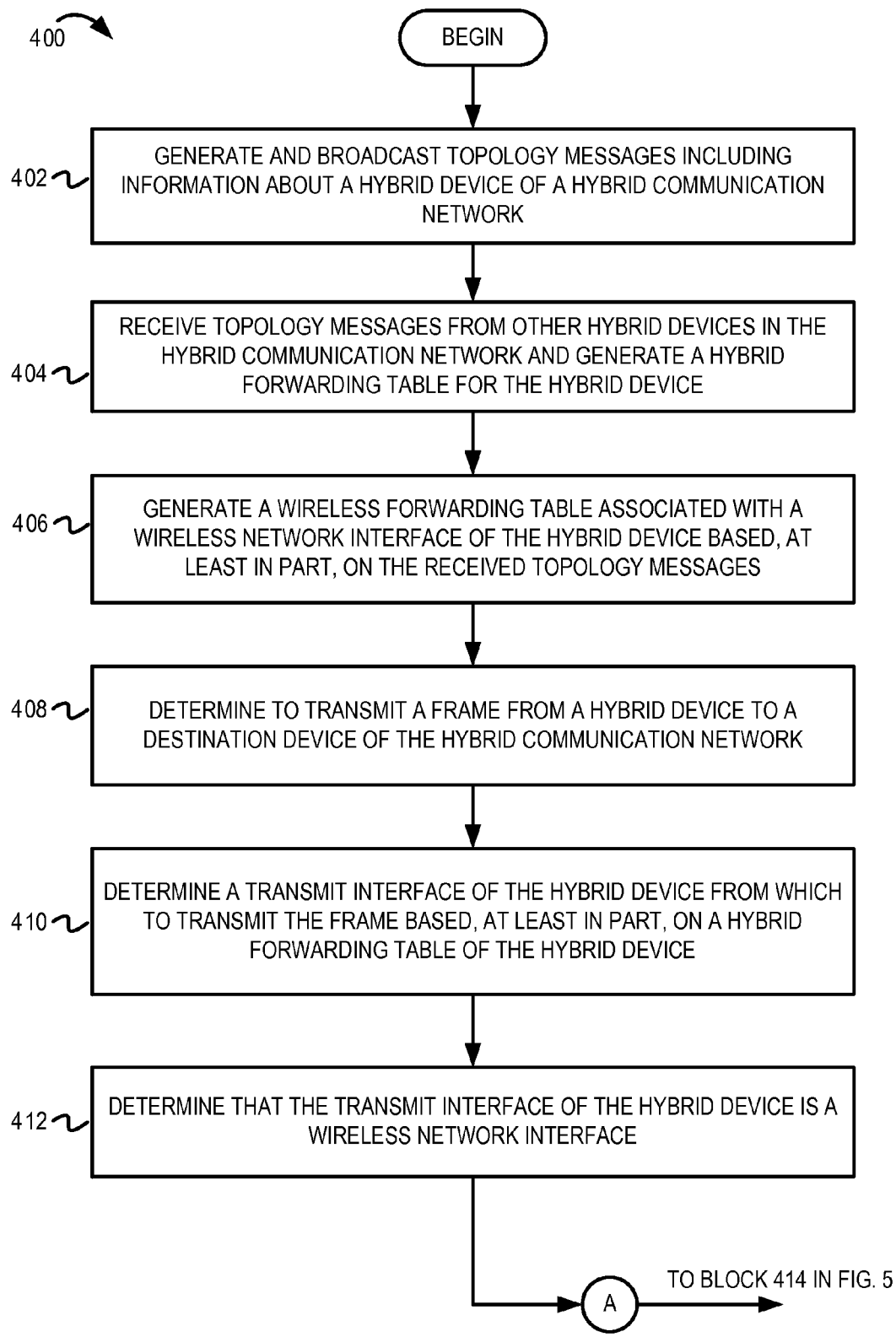
FIG. 4 is a flow diagram illustrating example operations for wireless bridging in a hybrid communication network.
Figure 5:
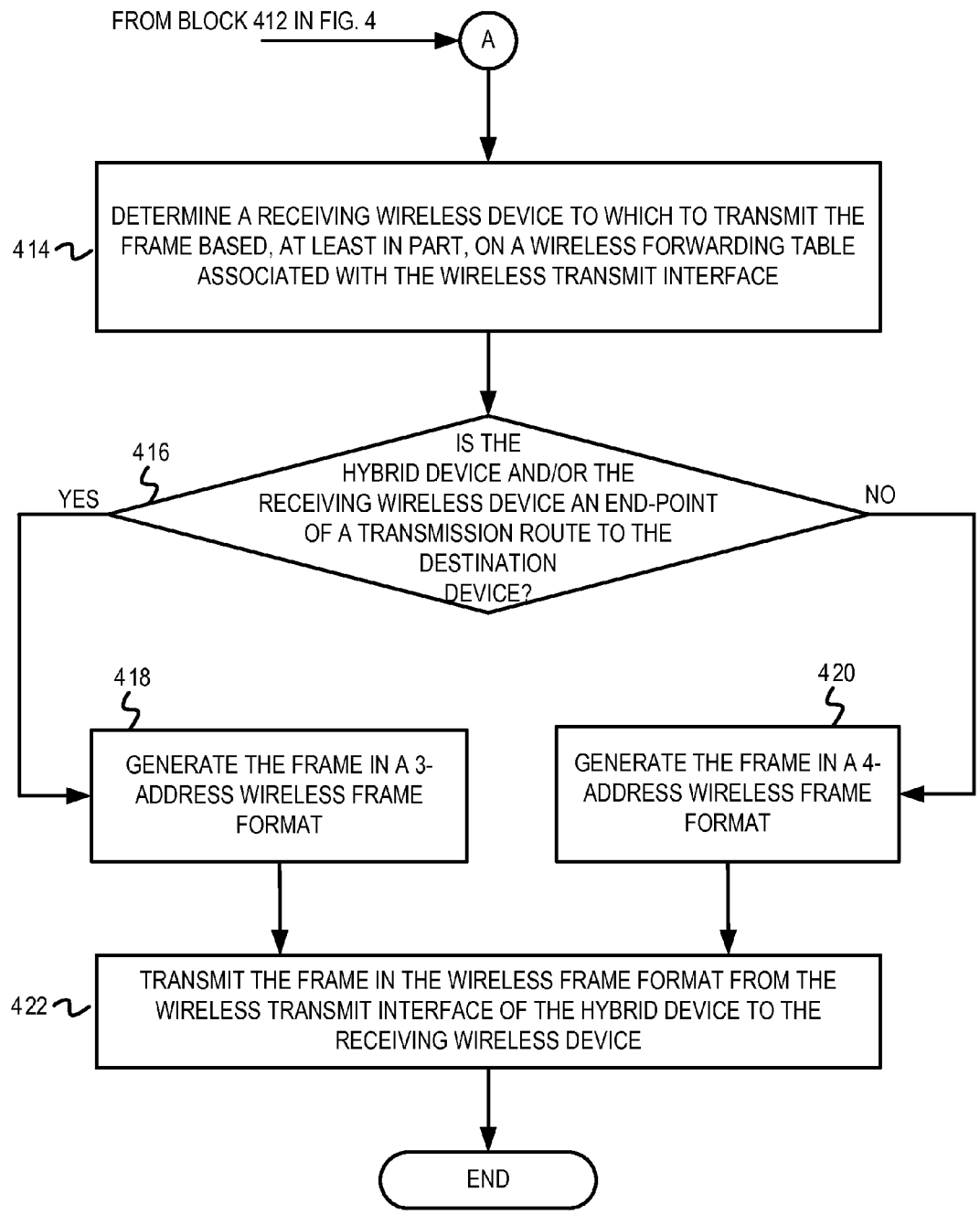
FIG. 5 is a continuation of FIG. 4 and also illustrates example operations for wireless bridging in the hybrid communication network.

FIGS. 4 and 5 depict a flow diagram ("flow") 400 illustrating example operations for wireless bridging in a hybrid communication network. The flow 400 begins at block 402 in FIG. 4.

At block 402, a hybrid device of a hybrid communication network generates and broadcasts topology messages including information about the hybrid device. As described above with reference to FIG. 3, the hybrid device 304 (e.g., a hybrid routing unit 106 of FIG. 1) determines information about the hybrid device 304 including network interfaces 316 and 318 of the hybrid device 304, neighbor devices connected to the hybrid device 304, whether the hybrid device 304 supports frame forwarding via its network interfaces, whether the hybrid device 304 comprises a WLAN interface that supports frame forwarding, whether the WLAN interface of the hybrid device 304 supports the 3-address and/or the 4-address WLAN frame format, communication capabilities of the hybrid device 304, etc. Referring back to FIG. 4, the flow continues at block 404.

At block 404, the hybrid device receives topology messages from other hybrid devices in the hybrid communication network and generates a hybrid forwarding table. As described above with reference to FIG. 3, the hybrid device 304 (e.g., the hybrid routing unit 106) receives topology messages from the other hybrid devices 302, 306, and 310 in the hybrid communication network 300. The hybrid device 304 (e.g., the hybrid routing unit 106) can analyze and consolidate the received topology messages and the information determined at block 402 and can construct the hybrid forwarding table 338 associated with the hybrid device 304. As discussed above with reference to FIGS. 1 and 3, the hybrid forwarding table 338 can be employed to determine a transmission route and a corresponding transmit interface from which the hybrid device 304 should transmit (or forward) a frame to a destination device. The flow continues at block 406.

At block 406, a wireless forwarding table associated with a wireless network interface of the hybrid device is generated based, at least in part, on the received topology messages. As discussed above with reference to FIGS. 1 and 3, a WLAN device (e.g., a legacy WLAN device or a WLAN interface of a hybrid device) is typically connected to multiple other WLAN devices in the WLAN segment 336 of the hybrid communication network 300. As depicted in FIG. 3, the WLAN interface 318 of the hybrid device 304 is connected to the WLAN interface 320 of the hybrid device 306 and to the WLAN interface 326 of the hybrid device 310. As depicted with reference to FIG. 3, the WLAN forwarding table 340 can indicate to which specific WLAN device to forward the frame for transmission to the destination device 308. In some embodiments, the WLAN interface 318 (e.g., the WLAN routing unit 116) can analyze the topology messages and generate the WLAN forwarding table 340. In other embodiments, the hybrid networking layer (e.g., the hybrid routing unit 106) of the hybrid device 304 can generate/populate the WLAN forwarding table 340 in addition to the hybrid forwarding table 338. The hybrid networking layer may provide the WLAN forwarding table 340 to the WLAN interface 318 of the hybrid device 304. The flow continues at block 408.

At block 408, it is determined to transmit a frame from the hybrid device to a destination device of the hybrid communication network. In some embodiments as described with reference to FIG. 3, the hybrid device 304 may receive a frame (generated by another network device 302) that is to be forwarded to the destination device 308. In other embodiments, the hybrid device 304 may generate the frame scheduled for transmission to the destination device 308. The flow continues at block 410.

At block 410, a transmit interface of the hybrid device from which to transmit the frame to the destination device is determined based, at least in part, on the hybrid forwarding table of the hybrid device. With reference to the example of FIG. 3, the hybrid device 304 (e.g., the hybrid routing unit 106) can access the hybrid forwarding table 338 and can identify the transmit interface from which to transmit the frame to the destination device 308. In the specific example of FIG. 3, the hybrid forwarding table 338 indicates that if the frame is intended for the Ethernet interface 324 of the destination device 308, then the frame should be forwarded from the WLAN interface 318 of the hybrid device 304. The flow continues at block 412.

At block 412, it is determined that the transmit interface is a wireless network interface. In one embodiment, the WLAN interface 318 (e.g., the WLAN routing unit 116) can receive the frame scheduled for transmission to the destination device 308 from the hybrid networking layer (e.g., the hybrid routing unit 106). The WLAN interface 318 can access the WLAN forwarding tables 340 to identify the receiving WLAN device (or receiving WLAN interface) to which to transmit the frame for WLAN bridging. In another embodiment, the hybrid routing unit 106 can determine that the transmit interface is the WLAN interface 318, access the WLAN forwarding table 340 associated with the WLAN interface 318, and identify the receiving WLAN interface. The flow continues at block 414 in FIG. 5.

At block 414, the receiving wireless device to which to transmit the frame is determined based, at least in part, on the wireless forwarding table associated with the wireless transmit interface. In response to determining (at block 412) that the frame should be transmitted from a WLAN interface 318 of the hybrid device 304, the receiving wireless device to which to transmit the frame should be transmitted is determined. With reference to the specific example of FIG. 3, the WLAN forwarding table 340 indicates that if the frame is intended for the Ethernet interface 324 of the destination device 308, then the frame should be transmitted to the WLAN interface 320 of the hybrid device 306. In this example, the WLAN interface 320 of the hybrid device 306 is identified as the receiving WLAN device. It is noted that in some embodiments, the receiving WLAN device can be a WLAN interface of a hybrid device; while in other embodiments, the receiving WLAN device can be a legacy WLAN device. The flow continues at block 416.

At block 416, it is determined whether the hybrid device and/or the receiving wireless device are an end-point of the transmission route to the destination device. In one embodiment, the WLAN interface 318 (e.g., the WLAN routing unit 116) can determine whether the WLAN interface 318 is the source interface (i.e., whether the hybrid device 304 generated the frame for transmission) and/or whether the WLAN interface 320 of the receiving wireless device 306 is the ultimate destination of the frame. Depending on whether the hybrid device and/or the receiving wireless device are the end-points of the transmission route, the WLAN interface 318 can transmit the WLAN frame in a 3-address WLAN frame format or a 4-address WLAN frame format. Additional details describing how the WLAN frame format is selected and how the WLAN frame is generated in the selected frame format are further described with reference to FIG. 6. If it is determined that the hybrid device 304 and/or the receiving wireless device 306 are an end-point of the transmission route to the destination device, the flow continues block 418. Otherwise, if it is determined that neither the hybrid device nor the receiving wireless device is an end-point of the transmission route to the destination device, the flow continues at block 420.

At block 418, the frame is generated in a 3-address wireless frame format. The flow 400 moves from block 416 to block 418 in response to determining that the hybrid device and/or the receiving wireless device are an end-point of the transmission route to the destination device. In one embodiment, the WLAN interface 318 (e.g., the WLAN routing unit 116) can generate the frame in the 3-address WLAN frame format. If the hybrid device 304 is the source device (e.g., if the hybrid device 304 originally generated the frame), the WLAN frame in the 3-address WLAN frame format can comprise an address of the source device (e.g., the address of the WLAN interface 318), an address of the receiving WLAN device (e.g., the address of the WLAN interface 320), and an address of the destination device (e.g. the address of the Ethernet interface 324). If the receiving WLAN device is the ultimate destination device (e.g., if the frame is intended for the hybrid device 306), the WLAN frame in the 3-address WLAN frame format can comprise an address of the source device (e.g., the address of the Ethernet interface 314 of the hybrid device 302), an address of the transmit device (e.g., the address of the WLAN interface 318), and an address of the destination device (e.g. the address of the WLAN interface 320). If the hybrid device 304 receives a frame (e.g., an Ethernet frame) from the hybrid device 302 for forwarding to the hybrid device 306 via the WLAN, the WLAN interface 318 (e.g., the WLAN routing unit 116) can modify the received Ethernet frame to generate a WLAN frame in the 3-address WLAN frame format described above. In some embodiments, the WLAN routing unit 116 can strip the Ethernet headers from the received Ethernet frame and encapsulate the remaining portion of the frame (e.g., the payload) in appropriate headers associated with the 3-address WLAN frame format. In other embodiments, the WLAN routing unit 116 can generate a new frame in the 3-address WLAN frame format to include the payload extracted from the received Ethernet frame. The flow continues at block 422.

At block 420, the frame is generated in a 4-address wireless frame format. The flow 400 moves from block 416 to block 420 in response to determining that neither the hybrid device nor the receiving wireless device is an end-point of the transmission route to the destination device. In one embodiment, the WLAN interface 318 (e.g., the WLAN routing unit 116) can generate the frame in the 4-address wireless frame format if the hybrid device 304 is not the source device and the receiving WLAN device 306 is not the ultimate destination device. With reference to the example of FIG. 3, the WLAN frame in the 4-address WLAN frame format can comprise an address of the source device (e.g., the address of the Ethernet interface 314 of the hybrid device 302), an address of the transmitting device of the current hop (e.g., the address of the WLAN interface 318), an address of the receiving device of the current hop (e.g. the address of the WLAN interface 320), and an address of the ultimate destination device (e.g., the Ethernet interface 324 of the destination device 308). As similarly discussed above with reference to block 418, the WLAN routing unit 116 can employ any suitable techniques to generate the WLAN frame in the 4-address WLAN format based on the received Ethernet frame. The flow continues at block 422.

At block 422, the frame in the wireless frame format is transmitted from the wireless transmit interface of the hybrid device to the receiving wireless device. The flow 400 moves from blocks 418 and 420 to block 422 after the WLAN interface (e.g., the WLAN routing unit 116) generates a WLAN frame in a suitable WLAN frame format. From block 422, the flow ends.

Figure 6:
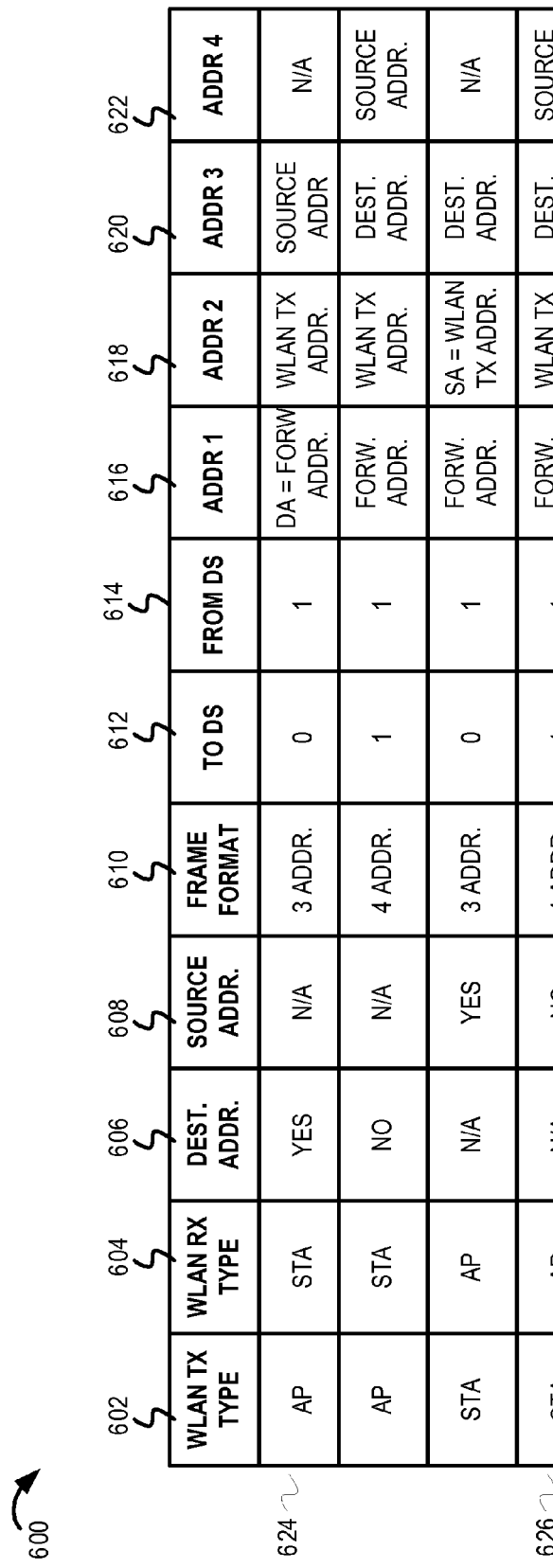
FIG. 6 is a table illustrating example embodiments for selecting a WLAN frame format.

FIG. 6 illustrates a table 600 including example embodiments for selecting a WLAN frame format. The table 600 provides an example listing of various scenarios where the 3-address WLAN frame format or the 4-address WLAN frame format can be used and how the WLAN frame in the selected frame format is generated. The example list of FIG. 6 can be applied to unicast, broadcast, and multicast frames. In FIG. 6, the WLAN interface 318 (e.g., the WLAN routing unit 116) can select the 3-address WLAN frame format or the 4-address WLAN frame format depending on the type of the WLAN interface, the source address and the destination address fields, and/or other suitable fields/characteristics. In response to determining to transmit a frame, the transmitting WLAN interface 318 (e.g., the WLAN routing unit 116) can determine the type of the transmitting WLAN interface (see column 602) and the type of the receiving WLAN interface (see column 604). Specifically, it may be determined whether the transmitting WLAN interface 318 and the receiving WLAN interface 320 is configured as a WLAN access point or a WLAN client station. The transmitting WLAN interface 318 (e.g., the WLAN routing unit 116) can then determine whether the destination address (see column 606) specified in the frame matches the address (e.g., a WLAN MAC address) of the receiving WLAN interface. The transmitting WLAN interface 318 can also determine whether the source address (see column 608) specified in the frame matches the address (e.g., a WLAN MAC address) of the transmitting WLAN interface. Based at least on these four inputs, the transmitting WLAN interface 318 (e.g., the WLAN routing unit 116) can determine whether to generate the WLAN frame using the 3-address WLAN frame format or the 4-address WLAN frame format, indicated in the table 600 as the frame format of column 610. For example, row 624 of the table 600 indicates that if the transmitting WLAN interface 318 is configured as a WLAN access point, if the receiving WLAN interface 320 is configured as a WLAN client station, if the destination address corresponds to the receiving WLAN interface 320, then the 3-address WLAN frame format should be employed, irrespective of whether the source address corresponds to the transmitting WLAN interface 318. As another example, row 626 of the table 600 indicates that if the transmitting WLAN interface 318 is configured as a WLAN client station, if the receiving WLAN interface 320 is configured as a WLAN access point, and if the source address does not correspond to the transmitting WLAN interface 318, then the 4-address WLAN frame format should be used, irrespective of whether the destination address corresponds to the receiving WLAN interface 320.

Columns 612-622 represent control fields in the WLAN frame and indicate how the WLAN frame should be populated under the various scenarios listed in the table 600. The "To DS" column 612 and the "From DS" column 614 indicate how these frame fields in frames transmitted from a WLAN interface should be populated. The table 600 can also indicate how the address fields (see columns 616, 618, 620, and 622) of the WLAN frame should be populated. The table 600 identifies the address field in which each of the following addresses should be specified (if applicable): A) the forwarding address (referred to as "forw addr" in the table 600) that is indicated in the matching forwarding rule of the WLAN forwarding table 340, B) the destination address (of the ultimate destination device 308), C) the source address (of the original source device 302), D) the address of the WLAN access point (e.g., WLAN MAC address, referred to as "AP addr" in the table 600) with which the WLAN client station is associated, and E) the address of the WLAN client station (e.g., WLAN MAC address, referred to as "WLAN TX addr" in the table 600), that transmits the frame. In one example, in the row 624 of the table 600, the transmitting WLAN interface 318 is configured as a WLAN access point, the receiving WLAN interface 320 is configured as a WLAN client station, the destination address corresponds to the receiving WLAN interface 320, and the source address does not correspond to the transmitting WLAN interface 318. Accordingly, the 3-address WLAN frame format is selected, the "To DS" and "From DS" fields are populated to indicate that the WLAN AP interface is transmitting a frame to a WLAN STA interface, the first address field is populated with the address of the receiving WLAN interface 320 (which is also the address of the destination device), the second address field is populated with the address of the transmitting WLAN interface 318, and the third address field is populated with the address of the source device.

In some embodiments, the WLAN routing unit 116 can select the appropriate frame format, determine the values that should be populated in the frame, and generate the frame accordingly. In other embodiments, however, the hybrid networking layer (e.g., the hybrid routing unit 106) can determine whether to use the 3-address WLAN frame format or the 4-address WLAN frame format and how to populate the frame. The hybrid routing unit 106 can construct the WLAN frame and can provide the WLAN frame to the WLAN routing unit 116 for transmission.

It should be understood that FIGS. 1-6 and the operations described herein are examples meant to aid in understanding embodiments and should not be used to limit embodiments or limit scope of the claims. Embodiments may perform additional operations, fewer operations, operations in a different order, operations in parallel, and some operations differently. For example, it is noted that the hybrid communication network 100 can comprise any suitable number of hybrid devices and any suitable number of legacy (non-hybrid) devices. In some embodiments, the hybrid communication network 100 may conform to or support, at least partially, the IEEE 1905.1 standard. The networking technologies may include Wi-Fi (e.g., using 2.4 GHz, 5 GHz, and/or another ISM band as its transmission medium), powerline communications (e.g., using electrical wiring as its transmission medium), Ethernet (e.g., using twisted pair, optical fiber, and/or other wired transmission media), and/or any of a variety of other networking technologies/transmission media.

It is noted that although FIG. 3 depicts the source hybrid device 302 transmitting a frame to the destination device 308 via two hybrid devices 304 and 306 that support WLAN frame forwarding, embodiments are not so limited. In other embodiments, there can be any suitable number intermediate/forwarding devices between the source and the destination devices. Furthermore, although FIG. 3 depicts the source hybrid device 302 generating an Ethernet frame for transmission to the destination device 308, embodiments are not so limited. In other embodiments, the source hybrid device 302 can generate the frame in any suitable format depending on the type of the source network interface selected for transmission. For example, if the source hybrid device 302 determines to transmit the frame from the PLC interface 312, the source hybrid device 302 may generate the frame using a PLC frame format. As another example, source hybrid device 302 may generate the frame using any suitable frame format supported by the IEEE 1905.1 standard.

Although FIG. 3 describes the WLAN interface 318 determining whether to use the 3-address WLAN frame format or the 4-address WLAN frame format depending on whether the current transmitting device (i.e., the hybrid device 304) and/or the current receiving device (i.e., the hybrid device 306) are endpoints of the transmission route, embodiments are not so limited. In other embodiments, the WLAN forwarding table 340 may also indicate whether the current receiving device supports the 4-address WLAN frame format and/or the 3-address WLAN frame format (based on information received in the topology messages). In some embodiments, the hybrid devices 304 and 306 may be used as wireless bridges only if the WLAN interfaces 318 and 320 both support the 4-address WLAN frame format. More specifically, by supporting the 4-address WLAN frame format, the hybrid devices 304 and 306 may be able to transmit the data received via the Ethernet (from the hybrid device 302) across the WLAN segment 336 even though the source device 302 and the destination device 308 may not be part of the WLAN segment 336.

Furthermore, although FIG. 3 depicts the first communication link and the last communication link being part of a wired network segment and the second (bridging) communication link being part of a wireless network segment, embodiments are not so limited. In other embodiments, the network segments being bridged by the WLAN bridging operations described herein may also be other types of wireless network segments. Thus, the first and/or the third communication links may be part of a different type of wireless network segment. For example, the first communication link may be part of a WiMAX communication network segment; the second (bridging) communication link may be part of the WLAN segment; and the third communication link may be part of a Bluetooth segment (or the WiMAX segment). As another example, the second (bridging) communication link may be part of a WLAN segment that supports frame forwarding and the 4-address WLAN frame format; while the first and the third communication links may be part of another WLAN segment that do not support the 4-address WLAN frame format. In some embodiments, although FIG. 3 depicts the hybrid communication network 300 comprising two Ethernet segments 332 and 333, embodiments are not so limited. In other embodiments, the hybrid communication network 300 may only comprise one Ethernet segment and all the Ethernet interfaces 314, 316, 324, 326, and 330 may be connected to a common Ethernet segment. In some networking technologies (e.g., PLC technologies), multi-hop routing maybe employed even if two hybrid devices are connected to the same network segment because of low-throughput links between the hybrid devices.

In some embodiments, the frame format of the frames transmitted across the different communication links (and different communication network segments) may be different. Each of the frame formats may have a different number and type of fields. For example, the frame format associated with the first communication link may by a 3-address frame format, while the frame format associated with the second and the third communication links may be a 4-address frame format. It is further noted that in some embodiments, the frame transmitted via a next communication link may be generated by stripping the header of the frame received via a previous communication link and encapsulating the payload in new headers associated with the next communication link. In other embodiments, a new frame may be generated for transmission via each communication link.

Although FIG. 3 depicts the wireless bridging techniques being implemented once in a transmission route (e.g., on a second communication link to bridge a first and third communication links of the transmission route), embodiments are not so limited. In other embodiments, the wireless bridging techniques can be performed any suitable number of times. For example, in addition to implementing the wireless bridging techniques on the second communication link to bridge the first and third communication links, the wireless bridging techniques can also be implemented on a fourth communication link to bridge the third and fifth communication links of the transmission route, and so on. Furthermore, the transmission route can comprise any suitable number of hops (or communication links), each of which support a different frame format and/or communication protocol.

In some embodiments, when a hybrid device receives a frame, it may attempt to locate a forwarding rule in the hybrid forwarding table (or in the WLAN forwarding table, if the frame is received at a WLAN interface) that matches the frame based on the destination address, the source address, and/or other fields/characteristics indicated in the frame classification information. If there is no matching frame forwarding rule, the frame may not be forwarded. Instead, the frame may be provided to upper protocol layers for subsequent processing (if available). If there is a matching frame forwarding rule, the frame may be provided to the network interface(s) indicated in the frame forwarding specification for transmission.

Although, the Figures describe the 3-address WLAN frame format being used if the transmitting WLAN device of the current hop is the source device and/or if the receiving WLAN device of the current hop is the ultimate destination device, embodiments are not so limited. In other embodiments, the WLAN interface can be configured to always use the 4-address WLAN frame format (e.g., even if the transmitting WLAN device of the current hop is the source device and/or if the receiving WLAN device of the current hop is the ultimate destination device). In one example of this embodiment, two of the four addresses may have the same address (e.g., the source address or the destination address may be indicated in two of the address fields). In another example of this embodiment, only three address fields may be utilized while the fourth address field may comprise a predetermined value (e.g., a "NULL" value).

Although the Figures describe the 4-address WLAN frame format being employed to bridge network devices in a hybrid communication network, it is noted that the 4-address WLAN frame format can be employed in various other embodiments. For example, any frame sent to (or from) a WLAN client station (e.g., an IEEE 802.11 client station not configured as an access point) where the destination address (or the source address) is not the address of the WLAN client station may utilize the 4-address WLAN frame format. As another example, the hybrid networking layer of a hybrid device may be assigned a unique MAC address. If the address of the WLAN interface (of a hybrid device) is different from the address of the hybrid networking layer, then all frames transmitted to or from the hybrid networking layer through the WLAN interface (over the WLAN segment) may use the 4-address WLAN frame format to indicate both the address of the hybrid networking layer and the address of the WLAN interface. In some embodiments, the 4-address WLAN frame format may also be used for communication between two hybrid devices via the WLAN segment. In this embodiment, the source address maybe the address of the hybrid networking layer of the source hybrid device, the transmit address may be the address of the WLAN interface of the source hybrid device, the receive address may be the address of the WLAN interface of the destination hybrid device, and the destination address maybe the address of the hybrid networking layer of the destination hybrid device. As another example, the 4-address WLAN frame format may be employed if the hybrid device comprises a WLAN client interface (e.g., an 802.11 client station that is not configured as an access point) that supports forwarding (or bridging) between a WLAN segment and another network segment. In this embodiment, as few as three network devices may be involved in the communication link—a network device on the WLAN segment, a network device on the other network, and the hybrid device configured to bridge the two networks.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
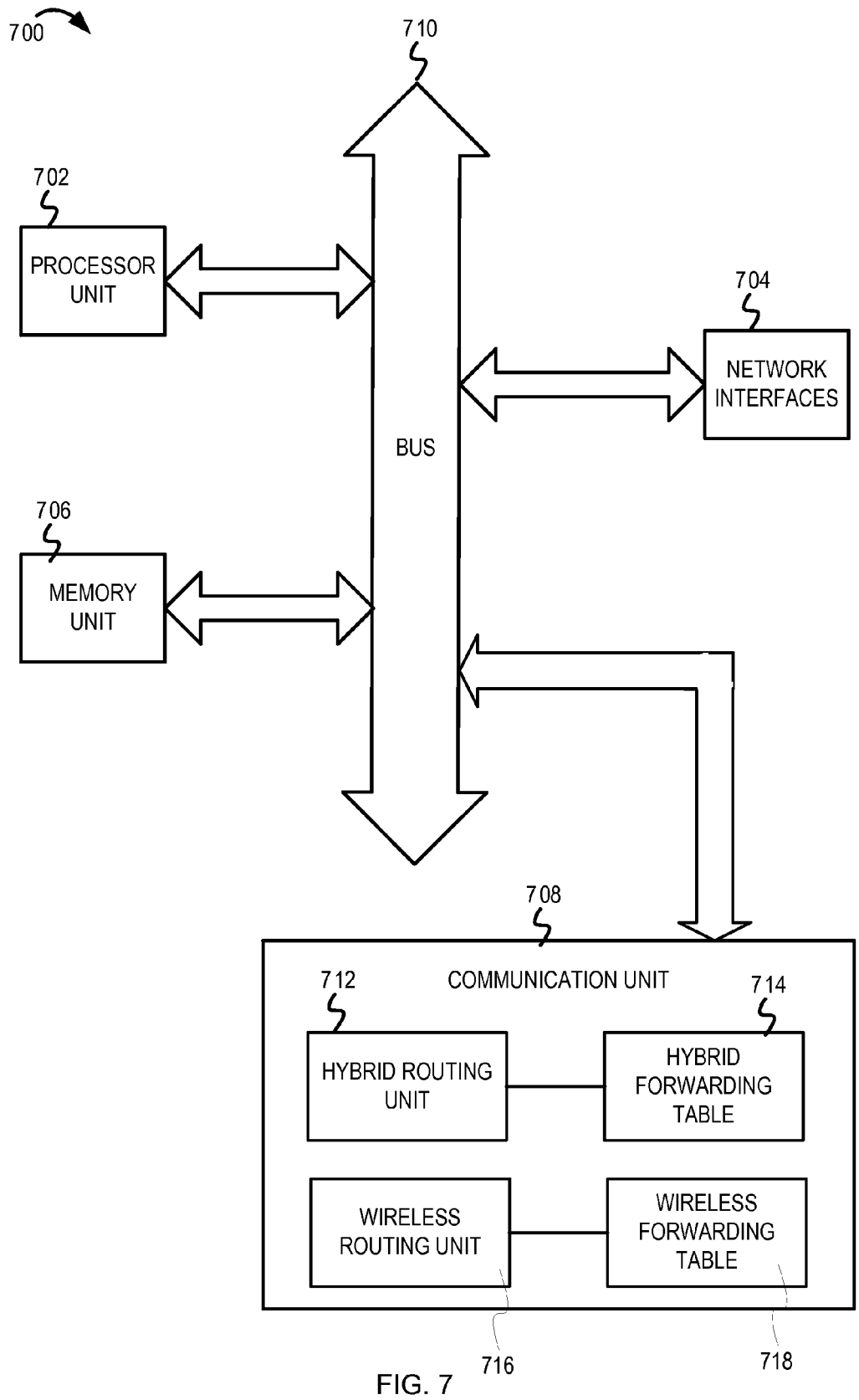
FIG. 7 is a block diagram of one embodiment of an electronic device including a wireless bridging mechanism.

FIG. 7 is a block diagram of one embodiment of an electronic device 700 including a wireless bridging mechanism. In some embodiments, the electronic device 700 can be a laptop computer, a tablet computer, a netbook, a mobile phone, a smart appliance, a gaming console, a desktop computer, a powerline communication device, a network bridge device, or other suitable electronic device comprising communication capabilities. The electronic device 700 includes a processor unit 702 (possibly including multiple processors, multiple cores, multiple nodes, and/or implementing multithreading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and/or a wired network interface (e.g., a powerline communication interface, an Ethernet interface, etc.). In some embodiments, the electronic device 700 can comprise a plurality of network interfaces (e.g., a PLC interface, an Ethernet interface, and a WLAN interface) that connect the electronic device 700 to a corresponding communication network (e.g., a powerline network segment, an Ethernet segment, and a WLAN segment respectively).

The electronic device 700 also includes a communication unit 708. The communication unit 708 comprises a hybrid routing unit 712, a hybrid forwarding table 714, a wireless routing unit 716, and a wireless forwarding table 718. As described above with reference to FIGS. 1-6, the hybrid routing unit 712 can identify a transmit network interface from which to forward a frame based, at least in part, on the hybrid forwarding table 714. If the transmit network interface is a wireless interface that supports frame forwarding, the wireless routing unit 716 can identify a receiving wireless network interface to which the frame should be transmitted based, at least in part, on the wireless forwarding table 718. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). For example, the communication unit 708 may comprise one or more additional processors that are distinct from the processor unit 702 coupled with the bus 710. The processor unit 702, the memory unit 706, and the network interfaces 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, wireless bridging techniques in a hybrid communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for wireless bridging comprising:
   receiving, at a first network interface of a hybrid device, a first data frame in a first frame format for transmission to a destination device of a hybrid communication network;
   determining to forward the first data frame via a wireless network interface of the hybrid device based, at least in part, on a hybrid forwarding table associated with a hybrid layer of the hybrid device, wherein the hybrid forwarding table associates the wireless network interface with a destination address of the first data frame;
   determining to forward the first data frame to a network device of the hybrid communication network based, at least in part, on a wireless forwarding table associated with the wireless network interface, wherein the wireless forwarding table associates a receive interface of the network device with the destination address; and
   generating a second data frame in accordance with a wireless frame format for transmission to the network device based, at least in part, on the first data frame, the hybrid device, and the network device.

2. The method of claim 1, wherein
said determining to forward the first data frame via the wireless network interface is performed at the hybrid layer associated with the hybrid device; and
said determining to forward the first data frame to the network device is performed at the wireless network interface.

3. The method of claim 1, further comprising:
determining whether the wireless network interface of the hybrid device is configured in an access point operating mode;
   determining to forward the first data frame to a wireless network interface of the network device when the wireless network interface of the hybrid device is in the access point operating mode, wherein the wireless network interface of the network device is configured in a client operating mode; and
   determining to forward the first data frame to a wireless network interface of an access point in communication with the hybrid device when the wireless network interface is in the client operating mode.

4. The method of claim 1, further comprising:
determining that the wireless network interface of the hybrid device and a wireless network interface of the network device are configured in a client operating mode;
determining whether the wireless network interface of the hybrid device and the wireless network interface of the network device support a direct communication link;
transmitting the second data frame from the wireless network interface of the hybrid device to the wireless network interface of the network device via the direct communication link when the wireless network interface of the hybrid device and the wireless network interface of the network device support the direct communication link; and
transmitting the second data frame to an access point in communication with the wireless network interface of the hybrid device for subsequent transmission to the wireless network interface of the network device when the wireless network interface of the hybrid device and the wireless network interface of the network device do not support the direct communication link.

5. The method of claim 1, wherein said generating the second data frame in accordance with the wireless frame format comprises:
   determining whether the hybrid device is a source device that generated the first data frame for transmission to the destination device; and
      generating the second data frame in accordance with a three-address wireless frame format when the hybrid device is the source device, wherein the second data frame includes an address of the hybrid device, an address of the network device, and an address of the destination device.

6. The method of claim 5, wherein in response to determining that the hybrid device is not the source device, the method further comprises:
   determining whether the network device is the destination device;
      generating the second data frame in accordance with the three-address wireless frame format when the network device is the destination device, wherein the second data frame includes an address of the source device, the address of the hybrid device, and the address of the network device; and
      generating the second data frame in accordance with a four-address wireless frame format when the network device is not the destination device and the hybrid device is not the source device, wherein the second data frame includes the address of the source device, the address of the hybrid device, the address of the network device, and the address of the destination device.

7. The method of claim 1, further comprising:
receiving a broadcast frame at the wireless network interface of the hybrid device from the network device, wherein the hybrid device is configured in a client operating mode, and wherein the network device is configured in an access point operating mode;
determining whether the broadcast frame was previously transmitted from the wireless network interface of the hybrid device to the network device for broadcasting;
   discarding the broadcast frame at the wireless network interface of the hybrid device when the broadcast frame was previously transmitted from the wireless network interface of the hybrid device; and
   providing the received broadcast frame to the hybrid layer of the hybrid device for processing and subsequent broadcasting via at least one other network interface of the hybrid device when the broadcast frame was not previously transmitted from the wireless network interface of the hybrid device.

8. The method of claim 7, wherein in response to said receiving the broadcast frame at the wireless network interface of the hybrid device from the network device, the method further comprises:
   filtering the broadcast frame at the wireless network interface of the hybrid device based, at least in part, on an original source address field in the broadcast frame, wherein the wireless forwarding table includes an indication of the network device that is reachable through the wireless network interface of the hybrid device; and
   in response to determining that the original source address field includes an address associated with the network device,
      discarding the broadcast frame at the wireless network interface of the hybrid device.

9. The method of claim 7, further comprising:
inserting an indicator field in the broadcast frame at the wireless network interface of the hybrid device, wherein the indicator field indicates that the wireless network interface of the hybrid device will transmit the broadcast frame to the network device;
transmitting the broadcast frame from the wireless network interface of the hybrid device to the network device; and
in response to receiving the broadcast frame at the wireless network interface of the hybrid device from the network device, said determining whether the broadcast frame was previously transmitted from the wireless network interface comprises:
   determining whether the received broadcast frame includes the indicator field inserted at the wireless network interface of the hybrid device.

10. The method of claim 1, wherein
the first network interface is an Ethernet interface or a powerline communication interface, and
the wireless network interface is a wireless local area network (WLAN) interface.

11. The method of claim 1, wherein said generating the second data frame comprises modifying the first data frame in accordance with the wireless frame format.

12. The method of claim 1, wherein the hybrid communication network comprises an IEEE P1905.1 communication network.

13. The method of claim 1,
wherein said receiving the first data frame comprises receiving the first data frame via a first communication network segment of the hybrid communication network; and
wherein said transmitting the second data frame comprises transmitting the second data frame via a second communication network segment of the hybrid communication network, wherein the second communication network segment is a wireless network segment.

14. The method of claim 1, further comprising:
receiving, at the hybrid device, a topology message from an additional hybrid device of the hybrid communication network, wherein the topology message includes information associated with the additional hybrid device;
populating at least the hybrid forwarding table associated with the hybrid device based, at least in part, on the topology message received from the additional hybrid device; and
transmitting the hybrid forwarding table associated with the hybrid device to the additional hybrid device.

15. The method of claim 14, further comprising:
populating the wireless forwarding table based, at least in part, on the topology message received from the additional hybrid device.

16. The method of claim 1, further comprising:
generating, at the hybrid device, a topology message that includes at least information about the hybrid device and information about the network device connected to the hybrid device; and
broadcasting the topology message from the hybrid device to one or more hybrid devices of the hybrid communication network.

17. The method of claim 16, wherein the topology message associated with the hybrid device includes an indication of forwarding capabilities associated with each of the first network interface and the wireless network interface.

18. The method of claim 17, wherein the topology message includes an indication that the wireless network interface of the hybrid device supports frame forwarding, a wireless frame format, and a communication link setup supported by the wireless network interface, and wherein the communication link setup supported by the wireless network interface of the hybrid device indicates whether the wireless network interface supports direct link wireless communication.

19. The method of claim 1, wherein generating a second data frame comprises generating the second data frame in accordance with a first wireless frame format or a second wireless frame format.

20. The method of claim 1, further comprising:
transmitting, to a central coordinator of the hybrid communication network, information associated with the hybrid device and an indication of the network device connected to the hybrid device; and
receiving, from the central coordinator, the hybrid forwarding table associated with the hybrid device and a second hybrid forwarding table associated with an additional hybrid device of the hybrid communication network.

21. A hybrid device comprising:
a plurality of network interfaces; and
a communication unit coupled with the plurality of network interfaces, the communication unit operable to:
receive a first data frame in a first frame format at a first network interface for transmission to a destination device of a hybrid communication network;
determine to forward the first data frame via a wireless network interface of the hybrid device based, at least in part, on a hybrid forwarding table associated with a hybrid layer of the hybrid device, wherein said hybrid forwarding table associates the wireless network interface with a destination address of the first data frame;
determine to forward the first data frame to a network device of the hybrid communication network based, at least in part, on a wireless forwarding table associated with the wireless network interface, wherein said wireless forwarding table associates a receive interface of the network device with the destination address; and
generate a second data frame in accordance with a wireless frame format for transmitting to the network device based, at least in part, on the first data frame, the hybrid device, and the network device.

22. The hybrid device of claim 21, wherein the communication unit is further operable to:
determine whether the wireless network interface of the hybrid device is configured in an access point operating mode;
determine to forward the first data frame to a wireless network interface of the network device when the wireless network interface of the hybrid device is in the access point operating mode, wherein the wireless network interface of the network device is configured in a client operating mode; and
determine to forward the first data frame to a wireless network interface of an access point in communication with the hybrid device when the wireless network interface of the hybrid device is in the client operating mode.

23. The hybrid device of claim 21, wherein the communication unit is further operable to:
determine that the wireless network interface of the hybrid device and a wireless network interface of the network device are configured in a client operating mode;
determine whether the wireless network interface of the hybrid device and the wireless network interface of the network device support a direct communication link;
transmit the second data frame from the wireless network interface of the hybrid device to the wireless network interface of the network device via the direct communication link when the wireless network interface of the hybrid device and the wireless network interface of the network device support the direct communication link; and
transmit the second data frame to an access point in communication with the wireless network interface of the hybrid device for subsequent transmission to the wireless network interface of the network device when the wireless network interface of the hybrid device and the wireless network interface of the network device do not support the direct communication link.

24. The hybrid device of claim 21, wherein the communication unit operable to generate the second data frame in accordance with the wireless frame format comprises the communication unit operable to:

determine whether the hybrid device is a source device that generated the first data frame for transmission to the destination device; and
generate the second data frame in accordance with a three-address wireless frame format when the hybrid device is the source device, wherein the second data frame includes an address of the hybrid device, an address of the network device, and an address of the destination device;
in response to determining that the hybrid device is not the source device,
determine whether the network device is the destination device;
generate the second data frame in accordance with the three-address wireless frame format when the network device is the destination device, wherein the second data frame includes an address of the source device, the address of the hybrid device, and the address of the network device; and
generate the second data frame in accordance with a four-address wireless frame format when the network device is not the destination device and the hybrid device is not the source device, wherein the second data frame includes the address of the source device, the address of the hybrid device, the address of the network device, and the address of the destination device.

25. The hybrid device of claim 21, wherein the communication unit is further operable to:
receive a broadcast frame at the wireless network interface of the hybrid device from the network device, wherein the hybrid device is configured in a client operating mode, and wherein the network device is configured in an access point operating mode;
determine whether the broadcast frame was previously transmitted from the wireless network interface of the hybrid device to the network device for broadcasting;
discard the broadcast frame at the wireless network interface of the hybrid device when the broadcast frame was previously transmitted from the wireless network interface of the hybrid device; and
provide the received broadcast frame to the hybrid layer of the hybrid device for processing and subsequent broadcasting via at least one other network interface of the hybrid device when the broadcast frame was not previously transmitted from the wireless network interface of the hybrid device.

26. The hybrid device of claim 21,
wherein the communication unit operable to receive the first data frame comprises the communication unit operable to receive the first data frame via a first communication network segment of the hybrid communication network; and
wherein the communication unit operable to transmit the second data frame comprises the communication unit operable to transmit the second data frame via a second communication network segment of the hybrid communication network, wherein the second communication network segment is a wireless network segment.

27. The hybrid device of claim 21, wherein the communication unit is further operable to:
receive a topology message from an additional hybrid device of the hybrid communication network, wherein the topology message includes information associated with the additional hybrid device;
populate at least the hybrid forwarding table based, at least in part, on the topology message received from the additional hybrid device; and
transmit the hybrid forwarding table to the additional hybrid device.

28. The hybrid device of claim 27, wherein the communication unit is further operable to:
populate the wireless forwarding table based, at least in part, on the topology message received from the additional hybrid device.

29. The hybrid device of claim 21, wherein the communication unit is further operable to:
generate a topology message that includes at least information about the hybrid device and information about the network device connected to the hybrid device; and
broadcast the topology message to one or more hybrid devices of the hybrid communication network.

30. The hybrid device of claim 29, wherein the topology message associated with the hybrid device includes an indication of forwarding capabilities associated with each of the first network interface and the wireless network interface.

31. A non-transitory machine-readable storage medium having instructions stored therein, which when executed by one or more processors causes the one or more processors to perform operations that comprise:
receiving a first data frame in a first frame format at a first network interface of a hybrid device of a hybrid communication network;
determining to forward the first data frame via a wireless network interface of the hybrid device based, at least in part, on a hybrid forwarding table associated with a hybrid layer of the hybrid device, wherein said hybrid forwarding table associates the wireless network interface with a destination address of the first data frame;
determining to forward the first data frame to a network device of the hybrid communication network based, at least in part, on a wireless forwarding table associated with the wireless network interface of the hybrid device, wherein said wireless forwarding table associates a receive interface of the network device with the destination address; and
generating a second data frame in accordance with a wireless frame format for transmission to the network device based, at least in part, on the first data frame, the hybrid device, and the network device.

32. The non-transitory machine-readable storage medium of claim 31, wherein the operations further comprise:
determining whether the wireless network interface of the hybrid device is configured in an access point operating mode;
determining to forward the first data frame to the receive interface of the network device when the wireless network interface of the hybrid device is in the access point operating mode, wherein the receive interface of the network device is configured in a client operating mode; and
determining to forward the first data frame to a wireless network interface of an access point in communication with the hybrid device when the wireless network interface of the hybrid device is in client operating mode.

33. The non-transitory machine-readable storage medium of claim 31, wherein the operations further comprise:
determining that the wireless network interface of the hybrid device and a wireless network interface of the network device are configured in a client operating mode;

determining whether the wireless network interface of the hybrid device and the wireless network interface of the network device support a direct communication link;

transmitting the second data frame from the wireless network interface of the hybrid device to the wireless network interface of the network device via the direct communication link when the wireless network interface of the hybrid device and the wireless network interface of the network device support the direct communication link; and transmitting the second data frame to an access point in communication with the wireless network interface of the hybrid device for subsequent transmission to the wireless network interface of the network device when the wireless network interface of the hybrid device and the wireless network interface of the network device do not support the direct communication link.

34. The non-transitory machine-readable storage medium of claim 31, wherein said operation of generating the second data frame in accordance with the wireless frame format comprises:

determining whether the hybrid device is a source device that generated the first data frame for transmission to a destination device; and generating the second data frame in accordance with a three-address wireless frame format when the hybrid device is the source device, wherein the second data frame includes an address of the hybrid device, an address of the network device, and an address of the destination device;

in response to determining that the hybrid device is not the source device, determining whether the network device is the destination device;

generating the second data frame in accordance with the three-address wireless frame format when the network device is the destination device, wherein the second data frame includes an address of the source device, the address of the hybrid device, and the address of the network device; and generating the second data frame in accordance with a four-address wireless frame format when the network device is not the destination device and the hybrid device is not the source device, wherein the second data frame includes the address of the source device, the address of the hybrid device, the address of the network device, and the address of the destination device.

35. The non-transitory machine-readable storage medium of claim 31, wherein the operations further comprise:

receiving a broadcast frame at the wireless network interface of the hybrid device from the network device, wherein the hybrid device is configured in a client operating mode, and wherein the network device is configured in an access point operating mode;

determining whether the broadcast frame was previously transmitted from the wireless network interface of the hybrid device to the network device for broadcasting;

discarding the broadcast frame at the wireless network interface of the hybrid device when the broadcast frame was previously transmitted from the wireless network interface of the hybrid device; and providing the received broadcast frame to the hybrid layer of the hybrid device for processing and subsequent broadcasting via other network interfaces of the hybrid device when the broadcast frame was not previously transmitted from the wireless network interface of the hybrid device.

36. The non-transitory machine-readable storage medium of claim 31, wherein the operations further comprise:

receiving, at the hybrid device, a topology message from an additional hybrid device of the hybrid communication network, wherein the topology message includes information associated with the additional hybrid device;

populating at least the hybrid forwarding table associated with the hybrid device based, at least in part, on the topology message received from the additional hybrid device; and transmitting the hybrid forwarding table associated with the hybrid device to the additional hybrid device.

37. The non-transitory machine-readable storage medium of claim 36, wherein the operations further comprise:

populating the wireless forwarding table based, at least in part, on the topology message received from the additional hybrid device.

* * * * *